United States Patent
Rabaeijs et al.

(10) Patent No.: US 6,967,992 B1
(45) Date of Patent: Nov. 22, 2005

(54) METHOD AND APPARATUS FOR RECEIVING GPS/GLONASS SIGNALS

(75) Inventors: Alain Rabaeijs, West Calder (GB); Eric Aardoom, Leuven (BE); Bert Gyselinckx, Heverlee (BE); Marc Engels, Wijgmaal (BE)

(73) Assignee: Interuniversitair Micro-Elektronica Centrum (IMEC), Leuven (BE)

( * ) Notice: Subject to any disclaimer, the term of this patent is extended or adjusted under 35 U.S.C. 154(b) by 0 days.

(21) Appl. No.: 09/196,658

(22) Filed: Nov. 19, 1998

Related U.S. Application Data
(60) Provisional application No. 60/066,161, filed on Nov. 19, 1997.

(30) Foreign Application Priority Data
| | | |
|---|---|---|
| Apr. 1, 1998 | (EP) | 98870066 |
| Jun. 12, 1998 | (EP) | 98110800 |

(51) Int. Cl.7 .......................... H04B 15/00; H04K 1/00; H04L 27/30
(52) U.S. Cl. .................. 375/150; 375/142; 342/357.12
(58) Field of Search ................... 375/130, 140, 375/142, 147, 150; 342/352, 357.06, 357.12

(56) References Cited

U.S. PATENT DOCUMENTS

| | | | | |
|---|---|---|---|---|
| 5,245,628 A | * | 9/1993 | LaPadula et al. | 375/148 |
| 5,293,170 A | * | 3/1994 | Lorenz et al. | 342/352 |
| 5,576,715 A | | 11/1996 | Litton et al. | |
| 5,600,670 A | | 2/1997 | Turney | |
| 5,610,984 A | | 3/1997 | Lennen | |
| 5,724,046 A | * | 3/1998 | Martin et al. | 342/357.12 |
| 6,259,401 B1 | * | 7/2001 | Woo | 342/357.12 |
| 6,400,753 B1 | * | 6/2002 | Kohli et al. | 375/134 |

FOREIGN PATENT DOCUMENTS

| | | |
|---|---|---|
| EP | 0 501 828 A1 | 9/1992 |
| EP | 0 508 621 A1 | 10/1992 |
| EP | 0 523 938 A1 | 1/1993 |
| EP | 07128423 | 5/1995 |
| EP | 0 351 156 B1 | 8/1995 |

OTHER PUBLICATIONS

XP001061401 (1989) European Patent Office.
Brown, Alison & Sward, William, "Digital Downconversion Test Results with a Broadband L–Band GPS Receiver", IEEE, Oct. 30, 1994, pp. 426–431.
Riley, et al., "A combined GPS/GLONASS high precision receiver for space applications", Sep. 1995.

* cited by examiner

Primary Examiner—Jean B. Corrielus
(74) Attorney, Agent, or Firm—Knobbe, Martens, Olson & Bear LLP

(57) ABSTRACT

An electronic system for receiving spread spectrum signals, in particular GPS and/or GLONASS signals is described. In particular, the functional specification for the design of an advanced GPS and/or GLONASS receiver (AGGR) is disclosed. The AGGR is preferably fabricated including at least one sub-system implemented as an application specific integrated circuit (ASIC). The present disclosure describes the AGGR functionality and its modes of operation to a detail allowing a future user of the device to understand its features and limitations and to assess its suitability for an envisaged application. A method and an apparatus are described for processing received spread spectrum signals modulated with a unique pseudo-random code including a capability of hierarchically chaining a plurality of channel modules in series, specific forms of delay line units and correlator units which can process CA-code, P-code and Y-code signals.

2 Claims, 13 Drawing Sheets

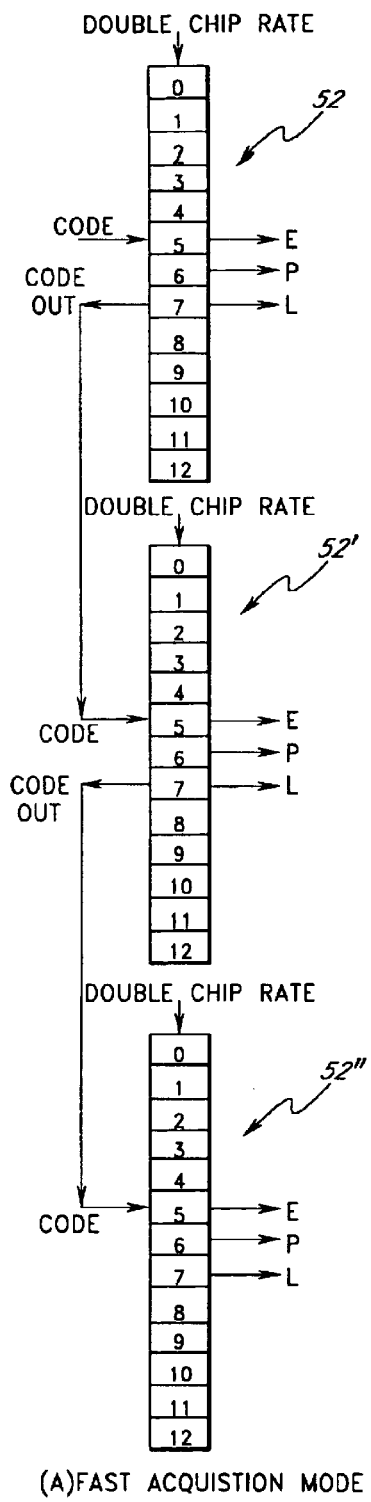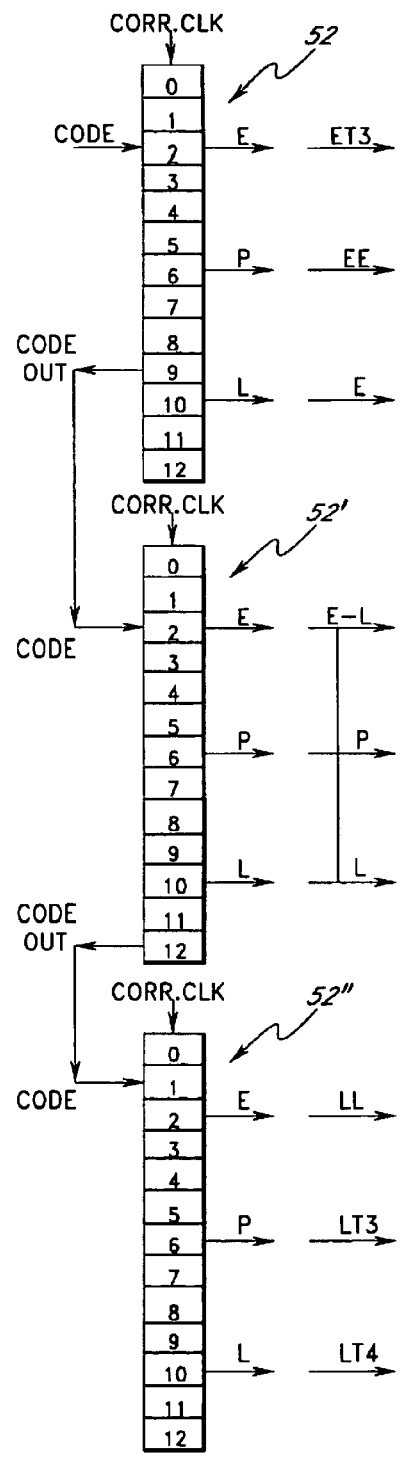
(A) FAST ACQUISTION MODE
*FIG. 9A*
(B) MULTIPATH MITIGATION WITH 8T SPACING BETWEEN E AND L
*FIG. 9B*

METHOD AND APPARATUS FOR RECEIVING GPS/GLONASS SIGNALS

RELATED APPLICATIONS

This application claims priority to provisional application no. 60/066,161, filed Nov. 19, 1997, entitled APPARATUS FOR RECEIVING GPS/GLONASS SIGNALS. Applicant hereby claims benefit under 35 U.S.C. §119(e).

The present invention relates to an electronic system and its components and to methods of operating the system and its components for receiving spread spectrum signals, for example, signals from a global positioning system such as GPS and/or GLONASS.

TECHNICAL BACKGROUND

An increasing number of applications and systems for communicating information nowadays makes use of the spread spectrum technique. The spread spectrum technique is a digital modulation technique in which a digital signal is spread over a wide frequency band so that it has a noise-like spectrum. This can be done by breaking up or "chopping" each data bit of the digital signal into multiple sub-bits (commonly called chips) that are then modulated and up-converted to a carrier frequency. The chopping may be done by multiplying the digital information signal with a so-called pseudo-random code or PN code. By using orthogonal codes for different communication links, the same frequency band can be used for different simultaneous communication links.

Using the same PN code as the transmitter, a receiver can correlate the received, spread signal and reconstruct the data signal while other receivers that use other codes or other transmission techniques cannot. One of the advantages of using the spread spectrum communication technique is the robustness to narrow band interference signals. Because spread-spectrum receivers are rapidly being introduced in applications and systems meant for the consumer markets, the cost of the receiver system is a major determining factor in order to remain competitive.

A specific class of spread spectrum systems are devices and receivers for position determination. Such devices are gaining importance for both the consumer market and for high precision applications. Most of the existing systems are based on the American Global Positioning System (GPS) system. Because this is also a military system, precise position determination can be made difficult by the satellite operator deliberately introducing errors (called "anti-spoofing"). Moreover, in many areas the number of visible satellites can be too limited to determine an accurate position. These two problems can be reduced by also using a second positioning system such as the Russian Global Orbiting Navigation Satellite System (GLONASS) system.

Combined GPS and GLONASS receivers have been reported, e.g. S. Riley, N. Howard, E. Aardoom, R. Daly, and P. Silvestrin, in "A combined GPS/GLONASS high precision receiver for space applications", ION-GPS 95, Palm Springs, USA, September 1995, or Japanese patent application JP 7128423-950519, "Receiver Common to GPS and GLONASS".

A GPS receiver is known from U.S. Pat. No. 5,293,170 which can be used with P-code modulated signals which have been modulated with an unknown code. Implementations of this known device require a lot of registers.

U.S. Pat. No. 5,600,670 describes a GPS receiver which includes a hierarchical chain of channel modules which includes slave modules and a master module. The known system does not provide sufficient flexibility.

AIMS OF THE INVENTION

An object of the present invention is to provide a method and an apparatus for processing received spread spectrum signals, particularly signals from a global navigational system, which allows an optimal flexibility in processing capabilities while reducing power consumption and manufacturing costs.

It is a further object of the present invention to provide a method and an apparatus for processing received spread spectrum signals, in particular signals from a global navigational system, which is suitable for implementation of at least one sub-system as an ASIC while maintaining an optimal flexibility in processing capabilities and reducing power consumption and chip area.

It is still another object of the present invention to provide a method and an apparatus for processing received signals from a global navigational system in which the processing of signals modulated with an unknown code is more efficient.

SUMMARY OF THE INVENTION

In accordance with a first embodiment the present invention may provide an apparatus processing received spread spectrum signals modulated with a unique pseudo-random code, comprising: a plurality of channel modules each including a correlator; means for hierarchically chaining a plurality of the channel modules in series, the means including a selector for selecting one channel module from at least two candidate channel modules for the next channel module of the chain.

In accordance with the first embodiment the present invention may also provide an apparatus for processing received spread spectrum signals modulated with a unique pseudo-random code, comprising: a plurality of channel modules each including a correlator; means for hierarchically chaining a plurality of the channel modules in series, code and/or control signals and/or carrier signals being passed from one channel module of the chain to the next; and a selector for selecting to transmit the code and/or control signals and/or carrier signals to the next channel module in the chain with a delay or without a delay.

In accordance with the first embodiment, the present invention may also provide a method of processing received spread spectrum signals using a plurality of channel modules each including a correlator, comprising at least one of the following steps: selecting one of two further modules to include within a chain of a plurality of channel modules; selecting to transmit code and/or control and/or carrier signals to the next channel module in a chain of a plurality of channel modules with or without delay.

In accordance with a second embodiment, the present invention may provide an apparatus for tracking received spread spectrum signals modulated with a unique pseudo-random code and for obtaining a correlation profile, comprising: a generator for generating a first replica of the pseudo-random code; a first demodulator for sequentially demodulating the received spread spectrum signals with the replica of the pseudo-random code at regular time intervals; a first integrator for integrating the output of the first demodulator; a second generator for generating a plurality of second versions of the first locally generated replica of the pseudo-random code, each second version having, in any one time interval, a selectably different timing compared with the timing of the first replica; a second demodulator for sequentially demodulating the received spread spectrum signal at regular integration time intervals with different ones of the second versions of the first replica and outputting the results; and a second single integrator for integrating each output of the second demodulator separately.

The second embodiment of the present invention may also provide a method for tracking received spread spectrum signals modulated with a unique pseudo-random code to obtain a correlation profile, comprising the steps of: generating a first locally generated replica of the pseudo-random code; sequentially demodulating the received spread spectrum signals with the first locally generated replica of the pseudo-random code at regular time intervals and integrating the result of each demodulation step in a first integration step using a first integrator; generating a plurality of second versions of the first locally generated replica of the pseudo-random code, each second version having a selectably different timing compared with the timing of the first replica in any one time interval; sequentially demodulating the received spread spectrum signal with different ones of the second versions of the first replica at regular time intervals and integrating each demodulation result separately in second integrating steps using a single second integrator.

The apparatus or method of the first embodiment may be used in combination with the apparatus or method of the second embodiment, respectively. In particular the first embodiment may be useful in both rapid acquisition and efficient tracking of spread spectrum signals, whereas the second embodiment may be useful in obtaining a correlation profile during tracking of the signals.

In accordance with a third embodiment, the present invention may provide an apparatus for despreading received spread spectrum signals, at least a part of the received signals being modulated with a first unique coarse acquisition pseudo-random code and a second precision unique pseudo-random code; comprising: a first plurality of correlators, a second plurality of correlators; and a switching device for switching any one of the first plurality of correlators to correlate the received spread spectrum signals with respect to one of the first and second unique pseudo-random codes.

The third embodiment of the present invention may also provide a method for despreading received spread spectrum signals, at least a part of the received signals being modulated with a first unique coarse acquisition pseudo-random code and a second precision unique pseudo-random code using a first plurality of correlators and a second plurality of correlators, the method comprising the steps of: selecting for any one of the first plurality of correlators so that this correlator correlates the received spread spectrum signals with respect to one of the first and second unique pseudo-random codes.

The third embodiment may be used with either of the first and second embodiments or in combination with both. The third embodiment may provide the advantage of flexibility of selecting correlators to correlate either CA-code or P-code signals of a Glonass or GPS global positioning system.

In accordance with a fourth embodiment, the present invention may provide an apparatus for despreading received spread spectrum signals at least a part of the received signals being modulated with a first unique coarse acquisition pseudo-random code and a second precision unique pseudo-random code; comprising: a demodulator for demodulating the received spread spectrum signals with a replica of the first pseudo-random code; a first integrator for integrating the result from the demodulator and for dumping the integrated value at the chip rate of the first pseudo-random code or a multiple thereof; a second integrator for integrating the results from the first integrator over a time period longer than the integration period of the first integrator.

The fourth embodiment of the present invention may also provide a method of despreading received spread spectrum signals at least a part of the received signals being modulated with a first unique coarse acquisition pseudo-random code and a second precision unique pseudo-random code; comprising the steps of: demodulating the received spread spectrum signals with a replica of the first pseudo-random code; integrating the result of the demodulation, the integrating step including the steps of: integrating the result from the demodulator in a first integrator and dumping the integrated value at the chip rate of the first pseudo-random code or a multiple thereof to a second integrator; and integrating the results from the first integrator in a second integrator over a time period longer than the integration period of the first integrator.

The fourth embodiment may be used in combination with any of the first to third embodiments or any sub-combination of these. The fourth embodiment may provide the advantage of a very power saving implementation of a CA-code correlator in a Glonass or GPS receiver.

In accordance with a fifth embodiment, the present invention may provide an apparatus for processing L1 and L2 spread spectrum signals received from at least one satellite of a global positioning system, wherein each of the spread spectrum signals includes a unique frequency carrier with a known pseudo-random known code modulated thereon, comprising: a generator for generating a single replica of the known code; a delay line connected to the generator, the delay line having a plurality of taps wherefrom the known code replica is available at different relative phases thereof; a first demodulator connected to the generator for demodulating one of the received L1 and L2 signals with the single replica of the known code without any substantial delay; a second demodulator selectably connectable to any one of the taps of the delay line for demodulating the other of the received L1 and L2 signals with a delayed replica of the known code, and a switch for selectably switching the other of the received L1 and L2 signals for demodulation by the first, and to switch the one of the received L1 and L2 signals for demodulation by the second demodulator.

The fifth embodiment may also provide a method of processing L1 and L2 spread spectrum signals received from at least one satellite of a global positioning system, wherein each of the signals includes a unique frequency carrier with a known pseudo-random code modulated thereon, comprising the steps of: locally generating a single replica of the known code; applying the single replica of the known code to a delay line having a plurality of taps wherefrom the code replica is available at different relative phases thereof; demodulating one of the received L1 and L2 signals with the single replica of the known code without any substantial delay; demodulating the other of the received L1 and L2 signals with the generated replica of the known code from one of the taps of the delay line, and switching the demodulation using the not substantially delayed single replica of the known code to the other of the received L1 and L2 signals and demodulating the one of the received L1 and L2 signals with a generated replica of the known code from one of the taps of the delay line.

The fifth embodiment may be used in combination with any of the first to fourth embodiments or with any combinations of these. The fifth embodiment may provide the advantage of the use of short delay lines in despreading L1 and L2 signals from a Glonass or GPS global positioning system.

In accordance with a sixth embodiment, the present invention may provide an apparatus for processing L1 and L2 spread spectrum signals received from at least one satellite of a global positioning system, wherein each of the spread spectrum signals includes a unique frequency carrier with a known pseudo-random P-code and an unknown code modulated thereon, comprising: a generator of replicas of the known P-code; a first demodulator connected to the generator for demodulating one of the received L1 and L2 signals with a replica of the P-code; a second demodulator for demodulating the other of the received L1 and L2 signals with a replica of the P-code; a first integrator for repetitively and separately integrating the demodulated one of the L1 and L2 signals over time periods related to the unknown code; a second integrator for repetitively and separately integrating the demodulated other of the L1 and L2 signals over time periods related to the unknown code, a correlator for correlating a result of the integration step from each of the two L1 and L2 signal paths with the integrated signal of the other of the L1 and L2 signal paths; and a phase adjuster for adjusting the phases of the locally generated P-code replicas relative to the incoming L1 and L2 signals in order to maximize the power of the correlated L1 and L2 signals, wherein the correlator includes: a comparator for comparing the absolute value of the integrated demodulated L1 and L2 signals; a combiner for individually combining the values of the integrated demodulated L1 and L2 signals with a unitary value having the sign of the integrated demodulated L1 and L2 signals having the largest value as output by the comparator; and a first accumulator for accumulating individually and separately the outputs of the combiner for the demodulated one of the L1 and L2 signals; and a second accumulator for accumulating individually and separately the outputs of the combiner for the demodulated other of the L1 and L2 signals. The combiner may be a multiplier.

The sixth embodiment may also provide a method of processing L1 and L2 spread spectrum signals, the received signals being received from at least one satellite of a global positioning system, wherein each of the signals includes a unique frequency carrier with a known pseudo-random P-code and an unknown code modulated thereon, comprising the steps of: locally generating replicas of the known P-code; demodulating the received L1 and L2 signals with replicas of the P-code; repetitively and separately integrating the demodulated L1 and L2 signals over time periods related to the unknown code; correlating a result of the integration step from each of the two L1 and L2 signal paths with the integrated signal of the other of the L1 and L2 signal paths; and adjusting the phases of the locally generated P-code replicas relative to the incoming L1 and L2 signals in order to maximize the power of the correlated L1 and L2 signals, whereby the resulting locally generated P-code phases are useable to determine information of the location of the receiving position with high accuracy, wherein the correlating step includes: comparing the absolute value of the integrated demodulated L1 and L2 signals; individually combining the values of the integrated demodulated L1 and L2 signals with a unitary value having the sign of the integrated demodulated L1 and L2 signals having the largest value as determined in the comparing step; and accumulating individually and separately the results of the combining step. The combining step may be a multiplying step.

The sixth embodiment may be used with any of the first to fifth embodiments or with any combination of these. The sixth embodiment may provide the advantage of allowing acquisition and tracking of spread spectrum signals modulated with an unknown spreading code.

In the above summary, in the following description and in the appended claims reference to demodulation, demodulating etc. comprises despreading of a spread spectrum signal. The dependent claims define further individual embodiments of the present invention. The present invention will now be described with reference to the following drawings.

BRIEF DESCRIPTION OF THE DRAWINGS

FIGS. 9a and b are two examples of three channel modules with slaved code delay lines in accordance with an embodiment of the present invention.

DEFINITIONS

Figure 1:
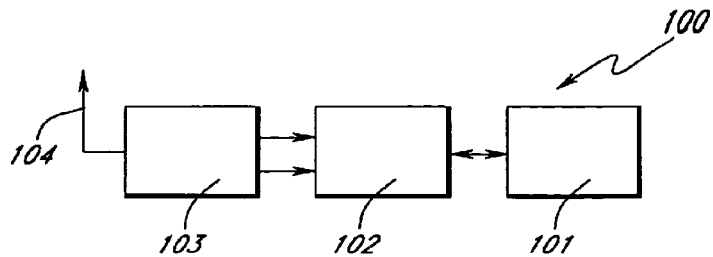
FIG. 1 is a schematic block diagram showing the major components of a spread spectrum receiver according to the present invention.

Channel: The functionality or hardware required to track one pseudo-noise code on a single frequency e.g. a navigation code such as CA on L1 of SV3 or P on L2 of SV19. For example, not all channels of the AGGR need be identical in functionality. For instance, some may only be able to track the CA-code, others also the P-code. Some can operate as a master in a master-slave configuration, and some not.

Dual-frequency channel: The functionality and hardware needed to track all three ranging signals transmitted by one GPS or GLONASS satellite are placed on one carrier (L1) and the same P-code is placed on a second carrier (P on L2). A dual-frequency channel is formed by grouping three single-frequency channels.

Observables: Information read from the AGGR, except the correlation values (i.e. carrier frequency cycle counter, phase and code carrier frequency cycle counter and phase for each channel).

Pseudorange measurements: Synonym for code-phase measurements.

RF conditioning input: The input to which the antenna is connected.

Measurement epoch signal: Periodic strobe signal which controls updating of observables, common to all channels.

Integration epoch signal: Periodic strobe signal which controls updating of frequency and/or phase of internal code and carrier replica signals, individual for each channel. This signal also updates correlator output registers.

Antenna switch epoch signal: Strobe signal which controls updating of correlator output registers.

Code epoch signal: Periodic strobe signal which indicates a unique pattern (corresponding to the all-ones state of the code generator shift register) in the generated or received pseudo-random noise code.

GNSS signals: Combination of GPS, GLONASS and various augmentation signals, e.g. EGNOS, WAAS, MTSAT.

Complex signal: A signal split into in-phase (I) and quadrature (Q) components.

Interchannel bias: Mean error between two channels tracking the same satellite signal.

Bit Numbering and Naming Conventions

Bussed signals are indexed from the least significant (LSB) to the most significant bit (MSB). The LSB has index 0 while the MSB of a vector of length N has index N−1. A suffix of "N" to a signal name indicates that a signal is active low. For example, ResetN is an active low signal.

List of Abbreviations

ADC: Analogue to Digital Converter
ADSP21020: Analog Devices Digital Signal Processor 21020
AGC: Automatic Gain Control
AGGR: Advanced GPS/GLONASS receiver
AGGA: Advanced GPS/GLONASS ASIC
AOCS: Attitude and Orbit Control System
AS: Anti-Spoofing, technique by which the GPS P-code is encrypted
ASIC: Application Specific Integrated Circuit
CA-code: Coarse Acquisition code
CaP-channel: Channel that can process CA- and P-codes
CDMA: Code Division Multiple Access
DAC: Digital to Analogue Converter
DSP: Digital Signal Processing
E: Early correlation
EGNOS: European Geostationary Navigation Overlay System
EOW: End Of Week
ERC32: Embedded Real-time Core, 32-bit Sparc microprocessor
GLONASS: Global Orbiting Navigation Satellite System
GNSS: Global Navigation Satellite Systems
GPS: Global Positioning System
I: In-phase
IF: Intermediate Frequency
IO: Input-Output
L: Late correlation
L1: Carrier frequency (1575.42 MHz for GPS, 1602.0+9/16* ch MHz for GLONASS)
L2: Carrier frequency (1227.6 MHz for GPS, 1246.0+7/16* ch MHz for GLONASS)
LFSR: Linear Feedback Shift Register
LSB: Least Significant Bit
MSB: Most Significant Bit
MSPS: Mega Samples Per Second
MTSAT: Mobile Transport Satellite system
NCO: Numerically Controlled Oscillator
P: Punctual correlation
PCB: Printed Circuit Board
P-code: Precision code
PLL: Phase-Locked Loop
PN-code: Pseudo-Noise code
POD: Precise Orbit Determination
PRN: Pseudo-Random Noise
Q: Quadrature
RF: Radio-Frequency
SA: Selective Availability
SM: Sign/Magnitude
SNR: Signal-to-Noise Ratio
SV: Space Vehicle
W-code: Code used to encrypt the GPS P-code to form the Y-code
WAAS: Wide Area Augmentation System
Y-code: Encrypted GPS P-code

DESCRIPTION OF THE ILLUSTRATIVE EMBODIMENTS

The present invention will be described with reference to specific embodiments and with reference to certain drawings but the invention is not limited thereto but only by the claims. Further, the present invention will mainly be described with reference to global positioning and navigation systems such as GLONASS or GPS but the present invention is not limited thereto but only by the claims. In particular, the present invention may find application with spread spectrum communications systems generally, in particular with direct sequence CDMA (DS-CDMA) systems. In particular, the functional specification for the design of an advanced GPS and/or GLONASS receiver (AGGR) is disclosed. The AGGR is preferably fabricated including at least one sub-system implemented as an application specific integrated circuit (ASIC). The ASIC implementation of the AGGR will be referred to as the AGGA. The AGGR and particularly the ASIC (AGGA), may be used in a variety of combined GPS/GLONASS receivers for a multitude of applications including, as a non-limiting list, synchronization of mobile telephone systems, personal location devices, high precision scientific instruments and satellite attitude and orbit control systems.

The main functional units of an AGGR 100 in accordance with an embodiment of the present invention are shown schematically in FIG. 1. The AGGR 100 may comprise a linear arrangement of a microprocessor 101, a digital correlator 102, an analog front-end 103 and an antenna or antennae, e.g. an antenna array, 104. The microprocessor 101 runs the applications software and controls the operation of the AGGR 100. The corrdator 102 comprises a number of channels or channel modules which can acquire and/or track spread spectrum signals, e.g. those received from a global positioning satellite. The correlator 102 may have the capability of multipath mitigation and/or calibration and/or fast acquisition. The front-end 103 converts the RF signals captured by the antenna 104 into time-discrete digital signals which can be used by the correlator 102. A suitable frontend unit 103 is known from co-pending European Patent Application No. 97870164.7 "Method and Apparatus for receiving and converting spread spectrum signals" which is incorporated herein by reference.

Figure 2:
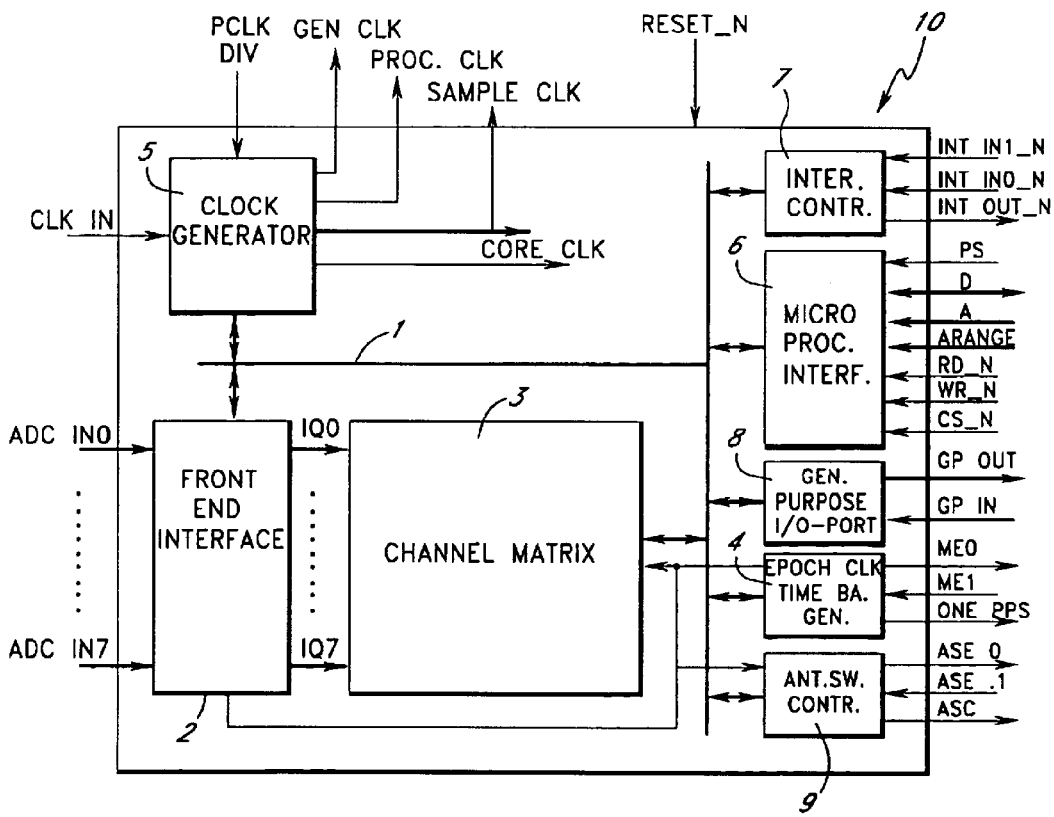
FIG. 2 is a schematic representation of a part of the correlator unit in accordance with one embodiment of the present invention.

In accordance with one embodiment of the present invention the correlator 102 may include an AGGA 10 but the present invention is not limited thereto and other forms of circuits may be used, e.g. PCB's. A schematic functional block diagram of an AGGA 10 in accordance with the present invention is shown in FIG. 2. The AGGA 10 comprises eight main functional blocks: a front-end interface 2 which interfaces with the front end 103, a channel matrix 3, a time base generator 4, a clock generator 5, a microprocessor interface 6 which interfaces with the receiver microprocessor 101, an interrupt controller 7, a general purpose IO port 8 and an antenna switch controller 9. The ResetN input signal is distributed to all modules 1–9. The modules 1–9 may be connected together via an internal bus 1.

In the following description reference may be made to registers. These registers are not shown in the drawings but may be located on-chip, i.e. on the same chip as the AGGA 10 ASIC. A memory map may be provided so that the address location of each register may be known to the microprocessor 101 independent of the specific design of this microprocessor 101.

The front-end interface 2 accepts digitized Intermediate Frequency (IF) input signals ADCIn0–7 from the analog front-end 103. The IF signal, for instance, can be real or complex. When real, the signal may be transformed into an In-Phase (I) and a Quadrature (Q) value and down-converted by a fixed frequency equal to a quarter of the sampling frequency. When the input IF signal is complex, it is represented as an In-Phase (I) and Quadrature (Q) value on two adjacent inputs. The down-conversion stage is then bypassed. AGGA 10 may be adapted to support a multitude of input formats, e.g. sign/magnitude, unsigned, two's complement and three-level comparator output. Furthermore, an estimate of the input energy (signal-plus-noise) may be measured to be used for automatic gain control (AGC) purposes, for instance, a signal level detector (not shown) may estimate the signal-plus-noise power of the I or Q branch of a complex signal and may be time shared by all inputs.

The channel matrix 3 contains a plurality (N) of independent channels, and may find general use in despreading spread-spectrum signals. In particular, in accordance with one embodiment of the present invention each channel may be capable of L1 or L2 CA-code processing. These channels can also be configured into groups of three to form up to N/3 independent dual-frequency tracking channels capable of tracking CA-code on L1 or L2 and P-code on L1 and L2. Furthermore, channels can be grouped in several other ways to support functions such as fast acquisition, attitude determination by means of interferometric carrier phase measurements and multipath mitigation.

The number of channels N in an AGGA 10 is determined by how many can be integrated in the chosen technology. Each channel can be configured independently to track a GNSS signal. Dual-frequency channels support P-code and Y-code tracking. At the end of each measurement epoch, carrier and code phase values for all channels are latched into a set of observable registers (not shown). At the end of the integration epoch (individual for each channel) the code correlation values are latched into a set of correlation registers (not shown). The correlation values are used by the receiver firmware to close the tracking loops, including carrier and code phase error computations, application of loop filters, and estimation of signal and noise amplitude. The observables are used by the receiver firmware to derive the position, time, velocity and in some cases attitude. The measurement epoch is provided by the time base generator 4 and is common for all channels.

The time base generator 4 preferably produces three periodic strobe signals EpochClk, MEO and OnePPS for accurate receiver time-keeping and observable measurements. The EpochClk output has a nominal frequency of 1 kHz and is the clock signal for the integration level epoch generation, the measurement epoch generation and the antenna switch controller. The measurement epoch output MEO is asserted to indicate the end of each measurement epoch. The measurement epoch input MEI accepts the MEO strobe from another AGGA 10 to enable synchronization of the observable measurements in configurations with more than one AGGA 10. The time base generator 4 also generates a one-pulse-per-second (OnePPS) signal to which external equipment can be synchronized.

The clock generator 5 produces one internal clock signal CoreClk and three external clock signals SampleClk, GenClk and ProcClk, all derived from an external clock. For instance, the AGGA 10 can generate clock signals for the ADC's and the internal channel matrix 3, a GP2010 front-end as made by GEC Plessey Semiconductors, UK and the receiver microprocessor 101. The different clock frequencies can be programmed individually. Three dedicated inputs are provided to program the clock division ratio of the microprocessor clock.

A microprocessor 101 can access the AGGA 10 through the microprocessor interface 6. The AGGA 10 may behave as a generic memory-mapped peripheral. An internal address decoder (not shown) may be provided in the microprocessor interface 6, which allows the microprocessor 101 to address up to 4 AGGA's 10 using only a single chip select line. Two dedicated inputs are provided to select the valid address range of the AGGA 10. The interface 6 is preferably directly compatible with the Analog Devices ADSP21020 and the ERC32 Sparc chip set. It is 32-bit wide and does not require wait-states at the specified processor clock frequencies of 20 MHz and 14 MHz for the ADSP21020 and ERC32, respectively, under the condition that the CoreClk frequency of the AGGA 10 exceeds the microprocessor clock frequency. Otherwise, the microprocessor 101 must insert wait-states to ensure that a read or write operation exceeds the CoreClk cycle time.

When various modules within the AGGA 10 require action by the microprocessor 101, this can be signaled through interrupt requests. The AGGA interrupt controller 7 receives these interrupt requests, stores them in an interrupt status register (not shown) and generates an external interrupt request. To connect multiple AGGA's 10 with a single interrupt signal to the microprocessor 101 the interrupt controller 7 may have two external interrupt inputs, allowing a number of AGGA's 10 to be connected, e.g. as a binary tree.

The parallel IO interface 8 supports functionality such as system monitoring and control functions, e.g. monitoring lock indicators of the external down-converter frequency synthesizers, or power-down of external circuitry. The output port 8 can, for example, be used for controlling parallel DACs for the front-end AGC functions. All IO pins are preferably unidirectional to prevent accidental short-circuits due to incorrect programming of the direction of IO drivers.

The antenna switch controller 9 provides means to control antenna switching for up to four antenna units 104, for instance, in a hybrid parallel-multiplex attitude determination GNSS receiver 100. It also produces an antenna switch epoch strobe which signals an antenna switch event and which is used to store correlator readings of all channels configured as slave channels. In configurations with more than one AGGA 10 only the antenna switch controller 9 of one master AGGA 10 need be enabled, while all other slave AGGA's 10 preferably use the Antenna Switch Epoch Output (ASE) of the master AGGA 10 to control their respective correlators 102.

Figure 3:
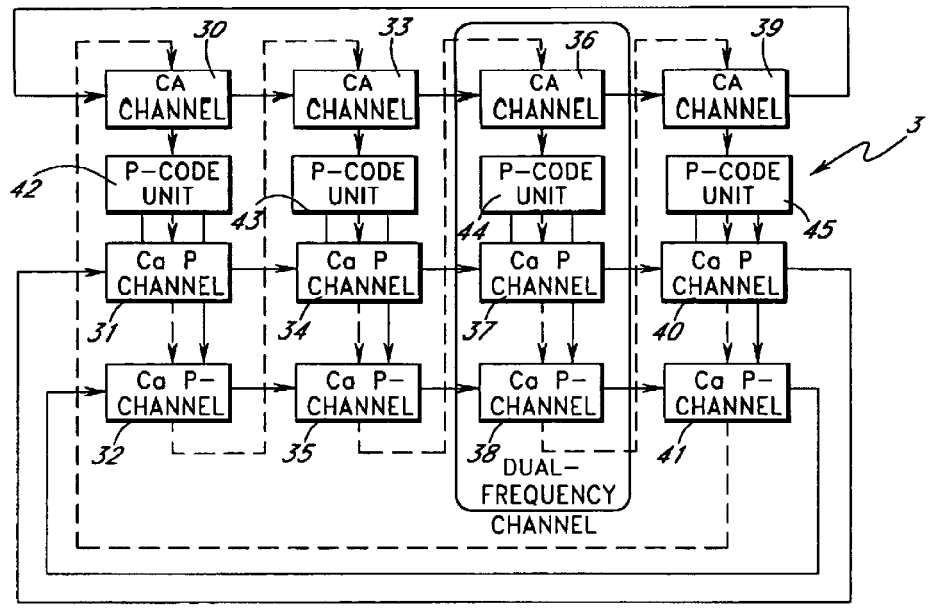
FIG. 3 is a schematic representation of a channel matrix in accordance with an embodiment of the present invention.

A structure of the channel matrix 3 in accordance with one embodiment of the present invention is shown schematically in FIG. 3. The channel matrix 3 includes a plurality of processing channels 30 to 41. Twelve channels are shown but the invention is not limited thereto. All channels 30 to 41 preferably have identical functionality for CA-code tracking. Any channel 30–41 can also be configured to process unmodulated input signals, a feature which is provided for the calibration of RF front-end group delay variations. Channels 30, 33, 36, 39 which can only track the CA-code are called CA-channels, while CaP-channels 31, 32, 34, 35, 37, 38, 40, 41 have additional functionality to enable them to track also P-code or Y-code modulated signals. A separate P-code unit 42–45 per dual-frequency channel generates the replica P-code for the pair of CaP-channels, e.g. 37, 38, when one CA-channel 36 and two CaP-channels 37, 38 are grouped to form a dual-frequency channel (one column of the channel matrix 3 as shown).

The channels 30–41 can be selectively slaved as indicated by the dashed or solid lines in FIG. 3. Slaving means at least that certain signals or signal parameters generated by the master channel (usually a CA-channel) are used by the next channel in the sequence or chain. Channels may be hierarchically chained together. For instance, for rapid acquisition all the CA-channels 30, 33, 36, 39 may be slaved together, the timing for the despreading operation used by one channel being passed on to the next channel in the sequence which adds a delay, attempts a correlation with the received signal and passes the delayed timing to the next channel and so on. By slaving, unnecessary re-calculation of signal parameters already calculated or used in the channel before may be avoided. In particular the speed of acquisition can be increased.

The operation of the channel matrix 3 is preferably entirely controlled by the external microprocessor 101. The basic functions of each channel 30–41 are: selection of one of eight complex output signals IQ0–7 from the front-end interface 2, down-conversion of the selected complex sign-magnitude signals IQ0–7 to baseband, despreading of the complex baseband signals with the on-chip generated CA or P replica code and integration over a programmable time interval. The result of these integrations are the correlation values. Together with the observables, which are the carrier and code frequency and phase measurements, they are the outputs of the channels 30–41.

A CA-channel 30, 33, 36, 39 preferably can process L1 or L2 CA-code modulated GNSS signals but not P-code or Y-code modulated signals. A block diagram of a CA-channel 30 in accordance with an embodiment of the present invention is shown schematically in FIG. 4. An input selector 302 selects one of the eight complex front-end interface output signals IQ0–7 with sample rate equal to the CoreClk rate. In an image reject mixer 305 any residual carrier frequency is removed by rotating the selected complex signal by an angle determined by a carrier generator 304, resulting in a complex baseband signal. A correlator unit 307 then despreads this signal using three CA-code sequence combinations E, P and L (early, punctual and late) and integrates the result during a programmable integration period. Hence, the correlator unit 307 includes six accumulators: three for each of the I and Q branches (not shown). The outputs of the correlator unit 307 are the correlation values. In the case of hybrid parallel-multiplex attitude determination, the integration period can be controlled by the antenna switch epoch (ASE) strobe.

The three CA-code sequences E, P and L are derived from a single CA-code sequence generated by the CA-code unit 306. The delays between the E, the P and the L sequences are determined by the settings of the CA-code delay-line unit 308. The CA-code chip rate is determined by the code numerically controlled oscillator (NCO, not shown) of the CA-code unit 306. The CA-code unit 306 also controls the length of the integration interval. The observables are sanpled on the MEO strobe. The data and the address buses D and A are used by the microprocessor 101 to access the registers in the channel.

Within one AGGA 101 each CA-channel 30, 33, 36, 39, or CaP-channel 31, 32, 34, 35, 37, 38, 40, 41, operating as a CA only channel, can be slaved to another channel as shown by the dashed or dotted lines in FIG. 3. The signals which can be used in slaving are preferably AngleExt, CodeExt and CorrCtlExt (carrier rotation angle, the locally generated code and associated correlator control signals), respectively. It is preferred in accordance with the present invention if not every channel can be slaved with any other channel as this is wasteful of resources and brings little processing gain. The slave channel selection rule for the channels shown in FIG. 3 may be summarized as follows: any channel C $\epsilon(0.. N-1)$ may be slaved to a channel which satisfies (C-1 mod N) or (C-3 mod N). This means that a channel may either be a slave of its previous neighbor in the same column (or the bottom of the previous column if C is at the top of a column) or be a slave of the channel in the corresponding position in the previous column (or in the last column if C is in the first column). The ability of the receiver in accordance with the present invention to select one of at least two candidate channel modules for the next module in a chain is a significant advantage over the known receiver of U.S. Pat. No. 5,600,670.

Figure 5:
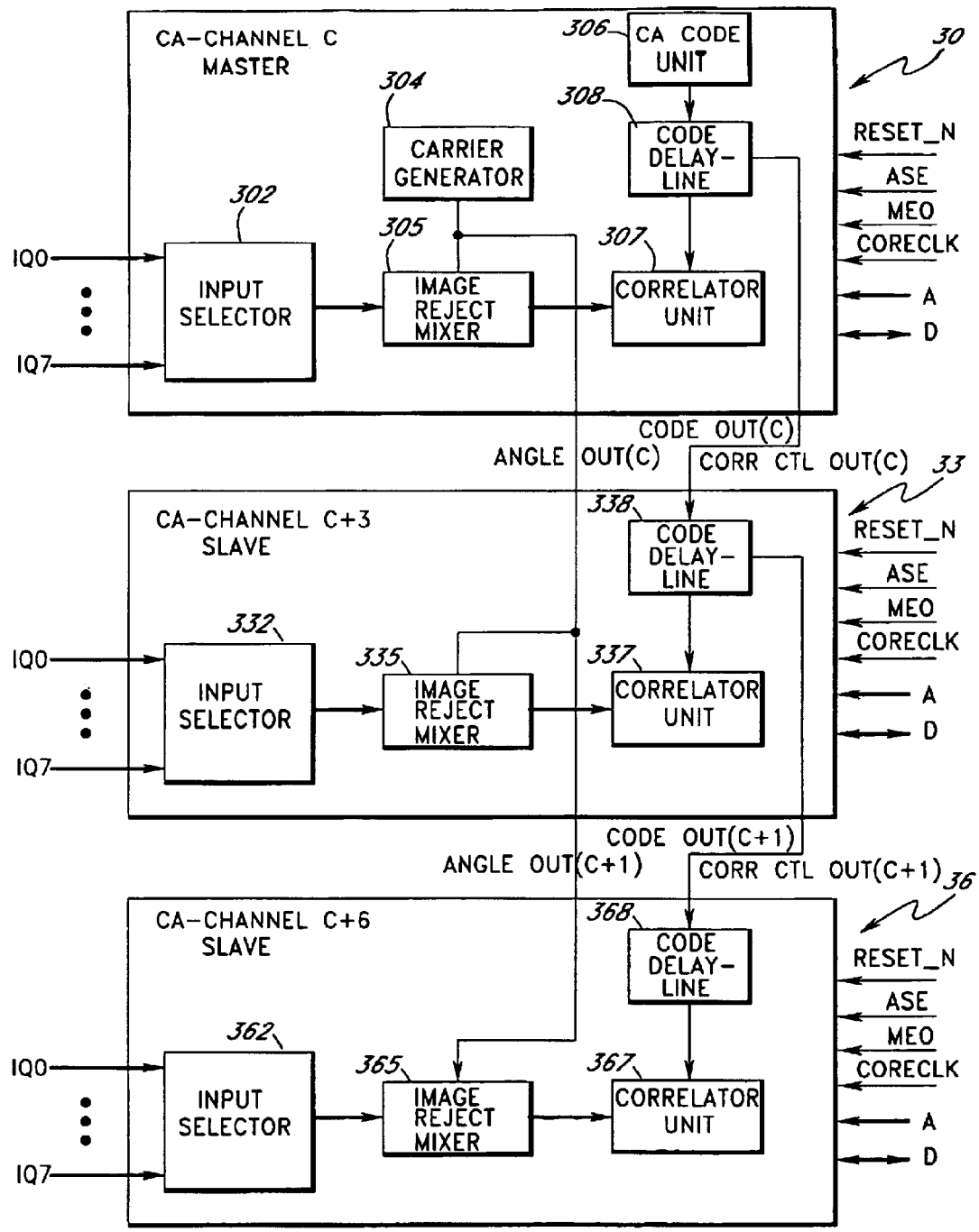
FIG. 5 is a schematic representation of a hierarchical chain of CA-channel modules in accordance with an embodiment of the present invention.

FIG. 5 shows schematically an embodiment of the present invention having one master 30 and two slave channels 33, 36 tracking CA-code only modulated signals. Each of the CA-channel 30, 33, 36 may be identical, components of the channels not used in this embodiment are not. shown for clarity purposes. Alternatively, one or more of the channels 30, 33, 36 may be CaP-channels 31, 32, 34, 35, 37, 38, 40, 41 of which only the components are shown required for CA-code acquisition. This configuration can be used for fast CA-code acquisition and for differential carrier phase measurements in attitude determination applications. The carrier rotation angle (AngleOut) for all channels is generated by the master carrier NCO unit 304 and distributed to all slave channels 33, 36. Likewise, the code (CodeOut) and associated correlator control signals (CorrCtlOut) for all channels 30–36 are generated by the master code unit 306 and distributed to the code delay line unit 338 of the first slave channel 33, which distributes these signals further down the chain.

In accordance with a specific embodiment of the present invention the replica CA-code sequences may or may not be delayed by the code delay-line units 308, 338, 368 of the master and slave channels 30, 33, 36 depending on the application. In accordance with the present invention the code delay-line units 308, 338, 368 may be programmed differently for fast acquisition and attitude determination, respectively. For fast acquisition, front-end input selectors 302, 332, 362 of all channels 30, 33, 36 are set to the same output of the front-end 103 and all delay-line units 308, 338, 368 are programmed to ½ or 1 CA-code chip delay. The correlator units 307, 337, 367 correlate the individually delayed CA-code sequence with the received signal —the more channels process the same signal simultaneously, the faster synchronization will be achieved. In accordance with one aspect of the present invention, the same signals from the front end 103 are processed by a selectable number of channels up to the maximum number of channels which can be assigned to the task of acquisition, hence resulting in rapid acquisition.

On the other hand, for attitude determination, all input selectors 302, 332, 362 are set to a different front-end output (i.e. they all receive the same basic signal but each one from a different antenna 104) and the delay-line units 308, 338, 368 are programmed for zero delay, such that all slave channels 33, 36 receive CA-code sequences from the master CA-code unit 306 with identical phase. It is a particular aspect of the present invention that the delay line units such as 308 are selectable for one of a plurality of pre-determined delays or for no delay depending upon the application.

Figure 6:
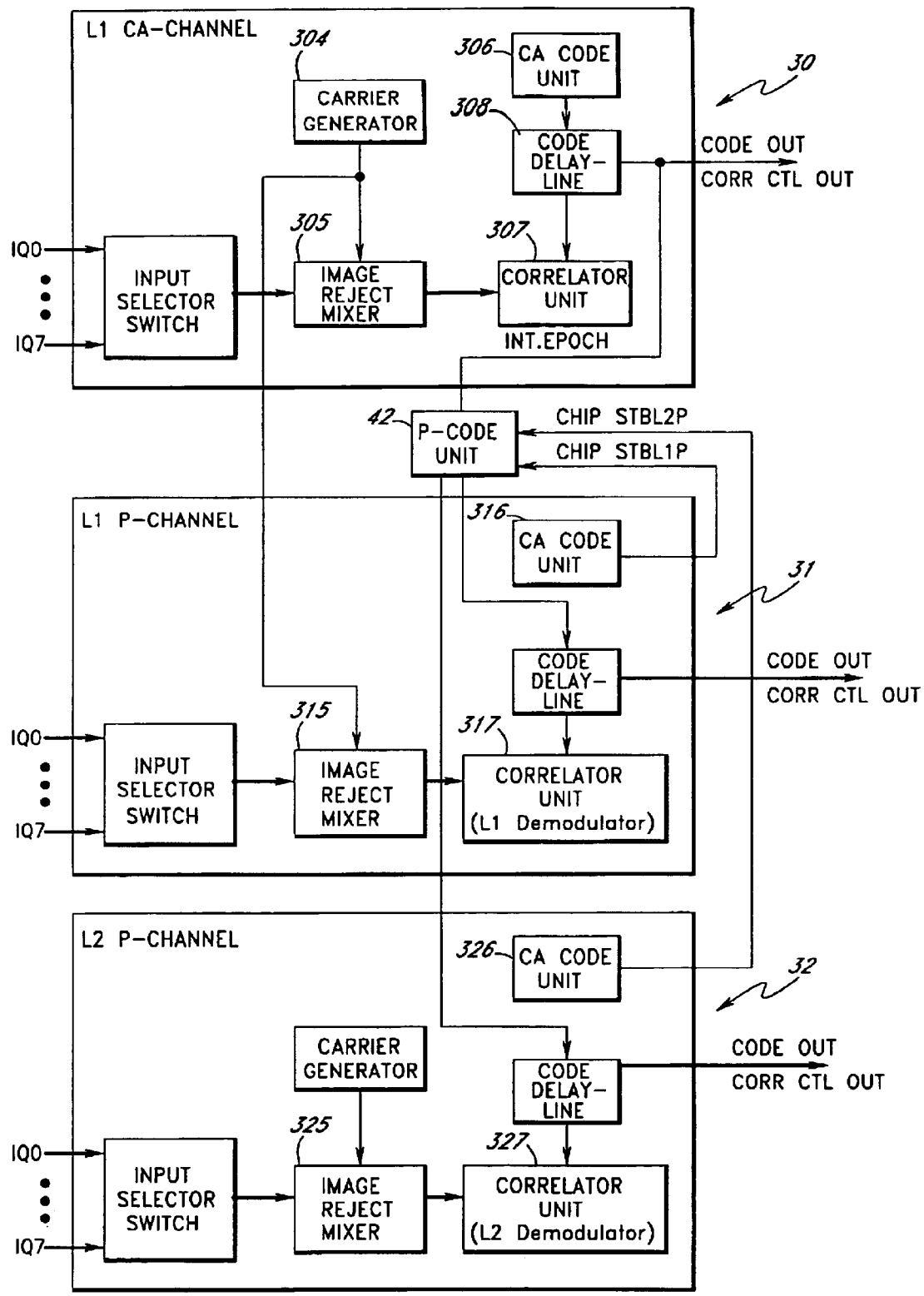
FIG. 6 is a schematic representation of a dual frequency channel in accordance with an embodiment of the present invention.

As shown schematically in FIG. 6, a combined CA and P (CaP) channel, e.g. 31 or 32 contains all the functionality for CA-code operation as described above with respect to FIGS. 3–5, e.g. the use of the image reject mixers 315, 325, with additional enhancements to the correlator units (L1 demodulator) 317, and the correlator unit (L2 demodulator) 327 for P-code and Y-code operation. A separate P-code unit 42–45 per dual-frequency channel generates the GPS and GLONASS P-codes and their associated integration control signals. Each CaP-code correlator unit 317, 327 is specially adapted for the integration of P-code and Y-code signals. More detail will be provided later with respect to codeless acquisition of the Y-coded signals in accordance with the present invention.

Normally a CA-channel such as 30 provides the carrier rotation angle for the L1 P-channel such as 31. However, the L1 P-channel 31 can also use its internal carrier generator (not shown in FIG. 6 for 31 but similar to 324 of 32) to generate the carrier rotation angle (this may be advantageous for better carrier phase performance in the presence of multipath). The correlator units 317, 327 of the CaP-channels 31, 32 are controlled by the CA-channel IntEpoch output signal, which is part of the CorrCtl bus. Hence the correlator units 307, 317, 327 of the CA-channel, the L1 P-channel and the L2 P-channel, respectively, of a dual-frequency channel integrate over the same time period. The IntEpoch signal is also used for triggering the P-code generator during P-code code acquisition and is therefore also input directly into the P-code unit 42. The rate at which the P-code for the L1 and L2 channels 31, 32 is generated is programmed in the code NCO's of the CA-code units 316, 326 of the L1 P-channel 31 and of an L2 P-channel 32, respectively.

In accordance with the present invention it is preferred if only two dual-frequency channels can be slaved in accordance with the rules defined by the dotted lines in FIG. 3. Such slaving doubles the number of correlator units available for tracking the P-code on L1 and the P-code on L2, a feature which is provided for multipath mitigation (at the cost of halving the number of available channels).

Figure 4:
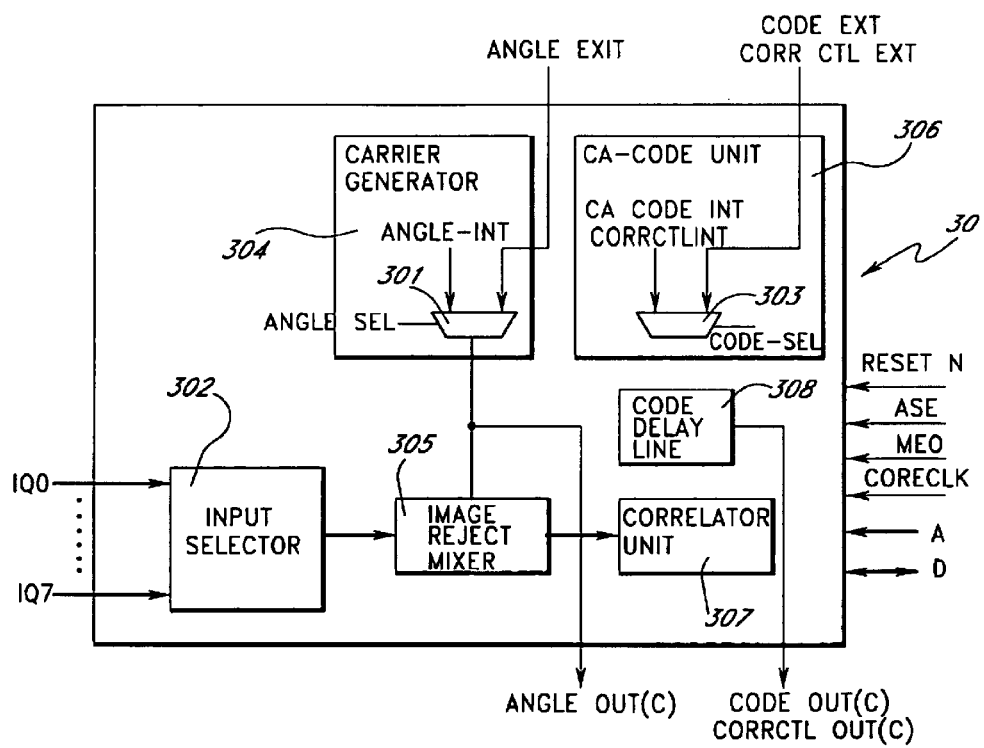
FIG. 4 is a schematic representation of a CA-channel module in accordance with an embodiment of the present invention.
Figure 7A:
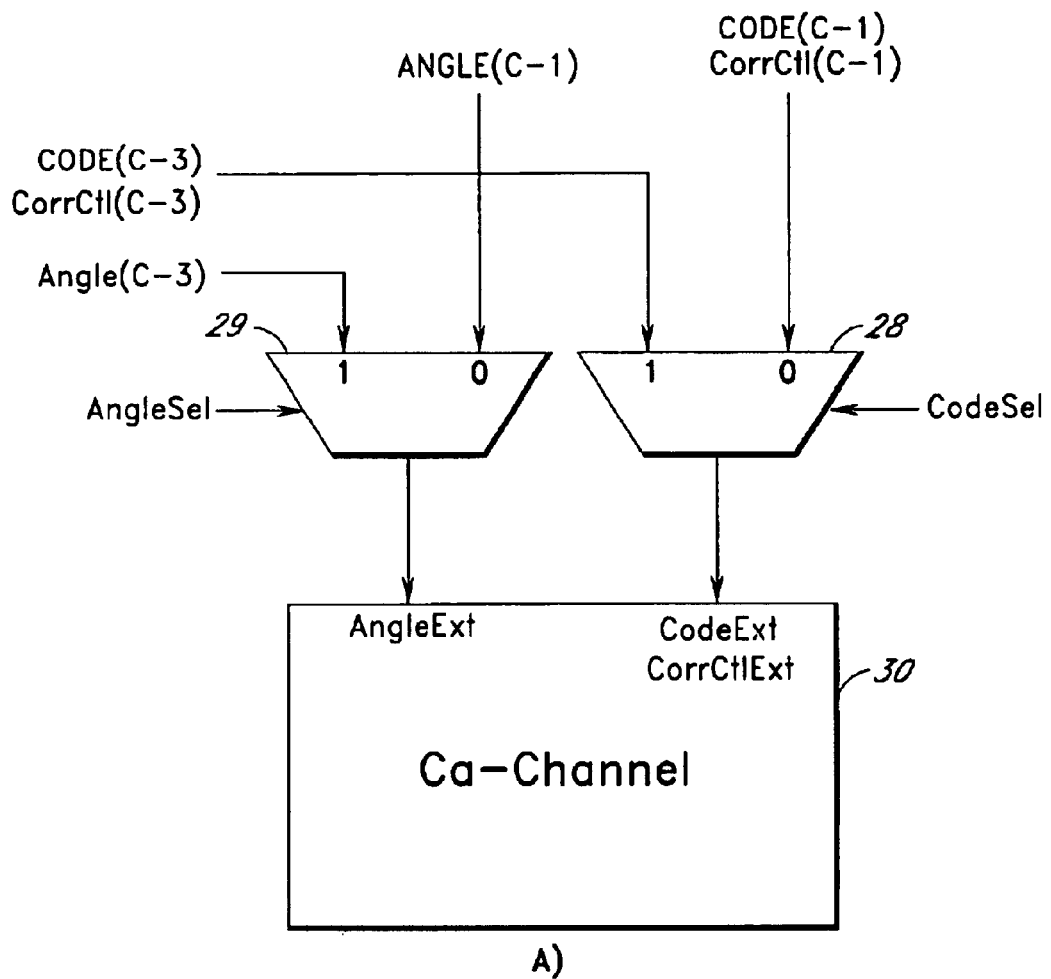
FIGS. 7a and b are a schematic representation of slaving control circuits for a CA-channel module and a CaP-channel module, respectively, in accordance with an embodiment of the present invention.

Some hardware is provided in accordance with the present invention to allow different groups of channels to be slaved together. The more possibilities that are allowed for grouping together channels, the larger the overhead on signal lines and multiplexers. Further, with current clock frequencies, the sum of all delays which can be tolerated is limited by the repetition rate of the received signals. Hence, the channel slaving requirements within one AGGA 10 in accordance with the present invention are preferably up to four single-frequency channels or up to two dual-frequency channels. If a channel is configured to accept external carrier phase angle, code and correlator control signals, the slaving multiplexers of the channel matrix 3 are preferably programmable to select the desired slaving sources. Selection may be done by means of multiplexers or selector gates as shown schematically in FIGS. 7a and b. With reference to FIG. 4 the rotational angle for correction of the carrier phase may be supplied internally or externally, the selection being made by a selector circuit, e.g. a multiplexer 304. The external Angle signal may come from one of two other previous channels depending on how the connection in the slaving chain is formed, either the previous neighbor (C-1) or the one three back (C-3). Hence, as shown in FIG. 7a a selector circuit is provided, e.g. a multiplexer 29, which selects between the Angle signal supplied by either the C-1 or C-3 channel depending upon the AngleSel signal. Similarly, the selection between external or internal Code signals in FIG. 3 is made by a selector circuit, e.g. a multiplexer 303. Which external Code signal is selected for the channel 30 is determined by a selector circuit, e.g. a multiplexer 28 depending upon the CodeSel signal. The signals that can preferably be slaved are Angle, Code (CA- or P-code) and various control signals grouped into CorrCtl, as shown in FIGS. 7a and b. Two related signals, DoubleChipRate and IntEpoch, are grouped as part of the CorrCtl bus to simplify the block diagrams.

Figure 7B:
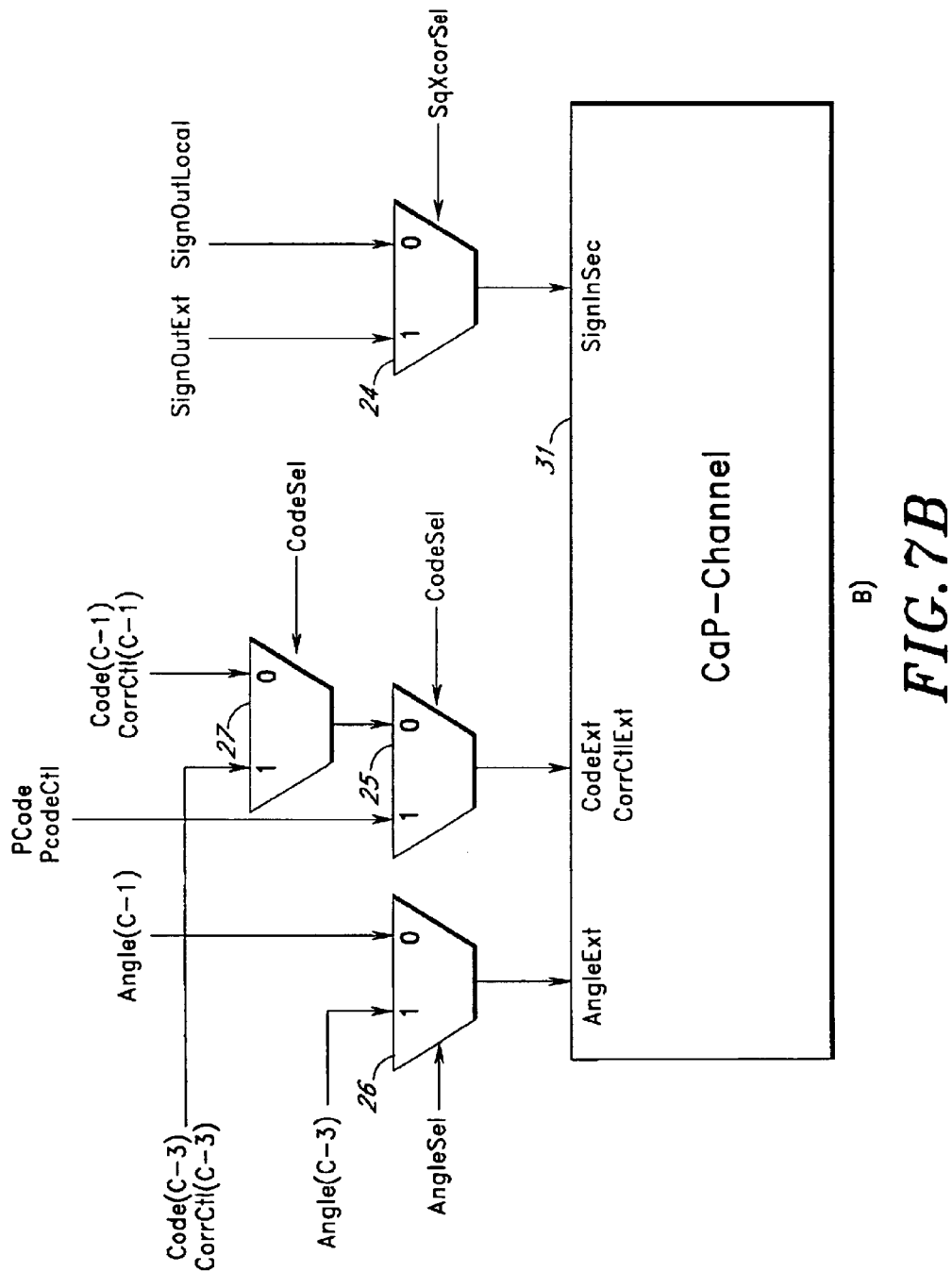

The control circuitry shown in FIG. 7b for a Ca-P channel module resembles that of FIG. 7a, e.g. selectors 26 and 27 are equivalent to selectors 29 and 28 respectively. In addition a further selector 25 is required to select whether the P-code is taken from a P-code unit or is received in slaving mode. In addition a selector 24 is required to control whether the SignInSec is external or local. This signal will be described later with respect to the extraction of Y-coded signals.

The code delay-line units such as 308 may produce Early (E), Punctual (P) and Late (L) versions of the replica code and optionally a version of IntEpoch. The code delay units in accordance with the present invention such as 308 may find general use in spread spectrum systems, e.g. in direct sequence CDMA. In accordance with an embodiment of the present invention the delays between the E, the P and the L code outputs are programmable. The three code output sequences are used by the correlator units such as 307 to despread the complex baseband signal.

Figure 8:
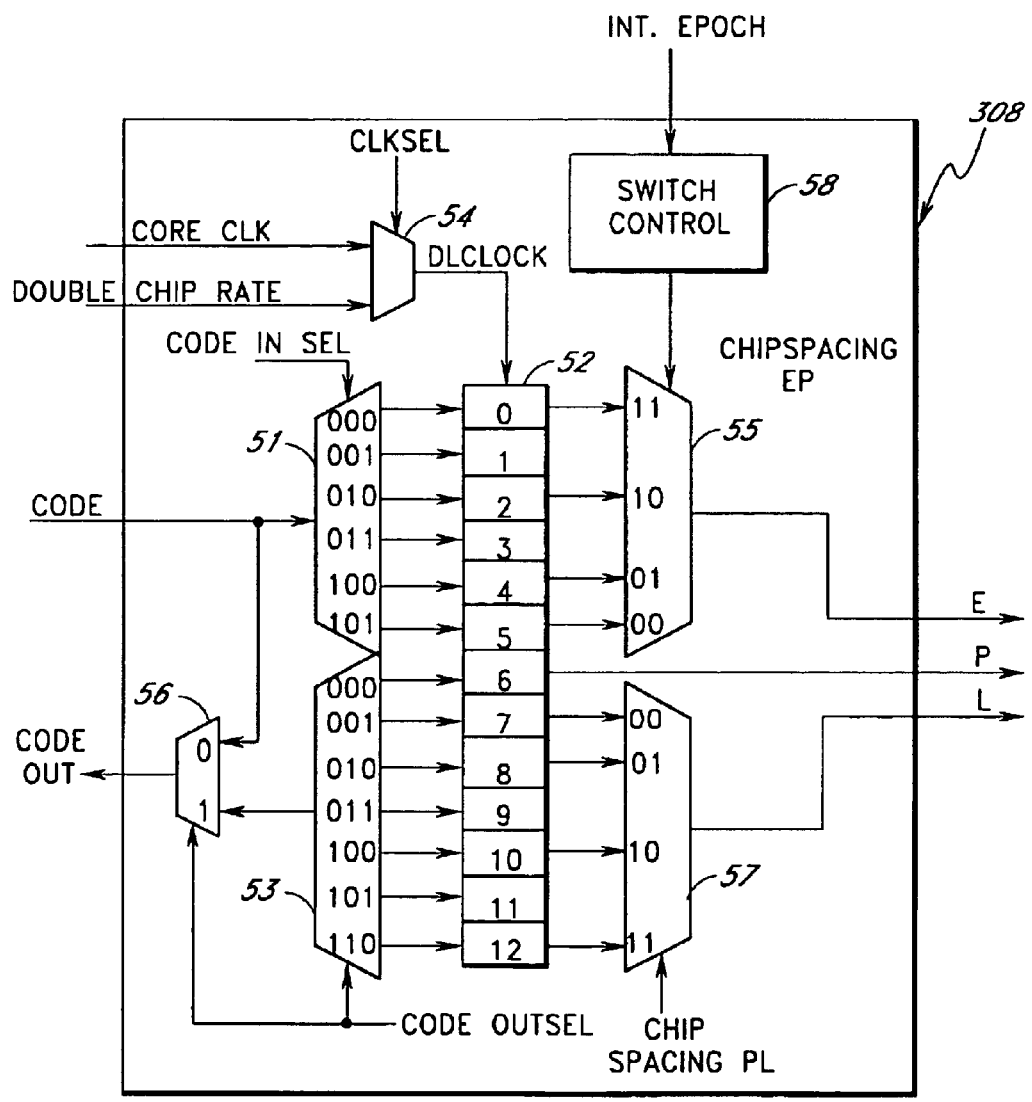
FIG. 8 is a schematic representation of a code delay line unit in accordance with an embodiment of the present invention.

FIG. 8 shows schematically a code delay-line block diagram in accordance with an embodiment of the present invention. A code delay-line unit, e.g. 308, selects three code phases E, P, L from a 13-stage delay-line 52. The output sequences are spaced by multiples of either half a code chip or one CoreClk period. The former is only valid for code chip rates lower than one-quarter of the CoreClk rate. The clock source is selected by a selector 54 to be either CoreClk or DoubleChipRate. The P version of the Code is taken from one tap of the delay line 52. The delay from the input Code signal to the P version thereof is at least two DLClock periods and at most seven DLClock periods (default value). CodeOut (passed to the next channel module in the chain if one exists) is either a non-delayed or a delayed version of the code and is used for channel slaving. The selection between non-delayed and delayed is made in the selector circuit 56. For configuring channels for attitude determination a zero delay between Code and CodeOut is selectable. By selective operation of the two selector circuits 51 and 53 the delay from Code to the delayed version of CodeOut can vary between two and thirteen DLClock periods. By selective operation of selector circuits 51 and 55, the delay from Code to E can vary between one and six DLClock periods.

Delay-line units such as 308 from several channels can be cascaded to produce code sequences with delays larger than those possible with a single delay-line 52. This feature is provided for rapid acquisition and multipath mitigation. A switch control module 58 supports the time-multiplexing of code sequences at different code spacings. This technique can be used for multipath mitigation measuring of the correlation profile. It is however not preferred in applications with high-dynamics.

The ChipSpacingPL field of the DelayLineMode register (e.g. part of on-chip memory) sets the chip spacing between the P and L code sequences. The following chip spacings between the E and P sequences or the P and L sequences can be programmed using the selectors 51, 55, 57: T, 2T, 4T, 6T, and ½ chip, 1 chips, 2 chips or 3 chips, where T is the CoreClk period. As a consequence the following chip spacings between E and L sequences can be programmed: 2T, 3T, 4T, 5T, 6T, 7T, 8T, 10T, 12T and 1 chip, 1.5 chips, 2 chips, 2.5 chips, 3 chips, 3.5 chips, 4 chips, 5 chips or 6 chips. The spacing in chips can only be used when the CoreClk frequency is at least four times the ChipRate. If this is not the case the chip spacing in multiples of the CoreClk period is preferably used.

The input selector 51 is used for cascading code delay-lines of slaved channels. Its purpose is to provide a programmable delay between the correlation measurements of the slaved channels. Specifically, it enables a programmable chip spacing for fast acquisition and multipath mitigation. The input code sequence can be fed into tap 0 to 5 of the delay-line 52. For correct behavior, the input selector 51 should select a delay-line tap with a number lower than or equal to the number of the tap selected for the E sequence.

The cascading output CodeOut can be connected to one of taps 6 to 12 of the delay-line 51 or directly to the Code input. By connecting the output selection of one code delay-line unit to the input of another delay-line unit, a single long delay line consisting of several slaved delay-lines of different channels can be created. This output can be programmed independently of the chip spacing.

In accordance with one embodiment of the present invention, a switch control functionality is used for time-sharing of a single correlator over different code sequences. This allows to measure the correlation profile without the need of extra correlators and is generally applicable to the despreading of spread spectrum signals. When this technique is used a different chip spacing (advance timing with respect to P) is selected for the E sequence by the selector circuit 55 at every IntEpoch interval but a single correlator is used to accumulate the results from each selection. The ability to selectively determine timing difference, i.e. the delay or advance, between the E and P or P and L sequences for each integration period is a significant advantage of the present invention. One advantage of this method is that the number of separate correlators required to measure the correlation profile is reduced. The timing sequence is controlled by the switch control module 58. It is preferably fully programmable to sequence over two to four cycle periods. This includes the number of time multiplexed taps (1 to 4) as well as the tap sequence. For example, for a switch sequence of three, the switch control sequence can be programmed to be T, 2T and 4T or T, 4T and 6T etc. The setting is buffered into a register on an IntEpoch strobe so that the microprocessor 101 can read to which E-P spacing the integration values correspond. The IntEpoch strobe is used to synchronize the transitions to the next switch setting to the integration interval. The provision of a programmable switch 58 is a significant advantage of the present invention as it allows the sequential determination of correlation values for the E sequences at a different advanced timing with respect to the P sequence, hence allowing generation of a correlation profile without requiring a separate correlator for each different advanced timing of the E sequence. Although the present invention has been described with reference to the switch control module 58 controlling the operation of the early delay line 55, the present invention also includes within its scope a switch control module for controlling the operation of the late delay line 57 in a similar way.

FIGS. 9a and b show two examples of the slaving capability of the AGGA in accordance with the present invention. FIG. 9a shows a possible configuration with three channels configured for fast-acquisition. The delay line units 52, 52' and 52" are clocked by the DoubleChipRate signal. Nine complex integrators are configured to correlate nine code sequences spaced by 0.5, 1, 1.5, 2, 2.5, 3, 3.5 and 4 code chips relative to the first E output tap. FIG. 9b shows three delay lines 52, 52', 52" slaved for multipath mitigation. The nine correlators are configured to correlate nine code sequences being ET3, EE, E, E-L, P, L, LL, LT3, LT4. With a CoreClk rate of 30 Mhz the E-L spacing is about 8/3 GPS P-code chips or 8/30 GPS CA-code chips.

The delay-line units such as 308 in accordance with the present invention support multipath mitigation in two-ways: channel slaving and time-multiplexing. Channel slaving allows multiple correlators to be cascaded such that more samples of the correlation function can be obtained, FIG. 9b shows an example of three channels with slaved code delay-lines. The spacing between two adjacent sequences is 4T. With a CoreClk of 20 MHz this is equivalent to 2 P-code chips. The right-most part of FIG. 9b is performed in a despreader module of a correlator unit.

Figure 10:
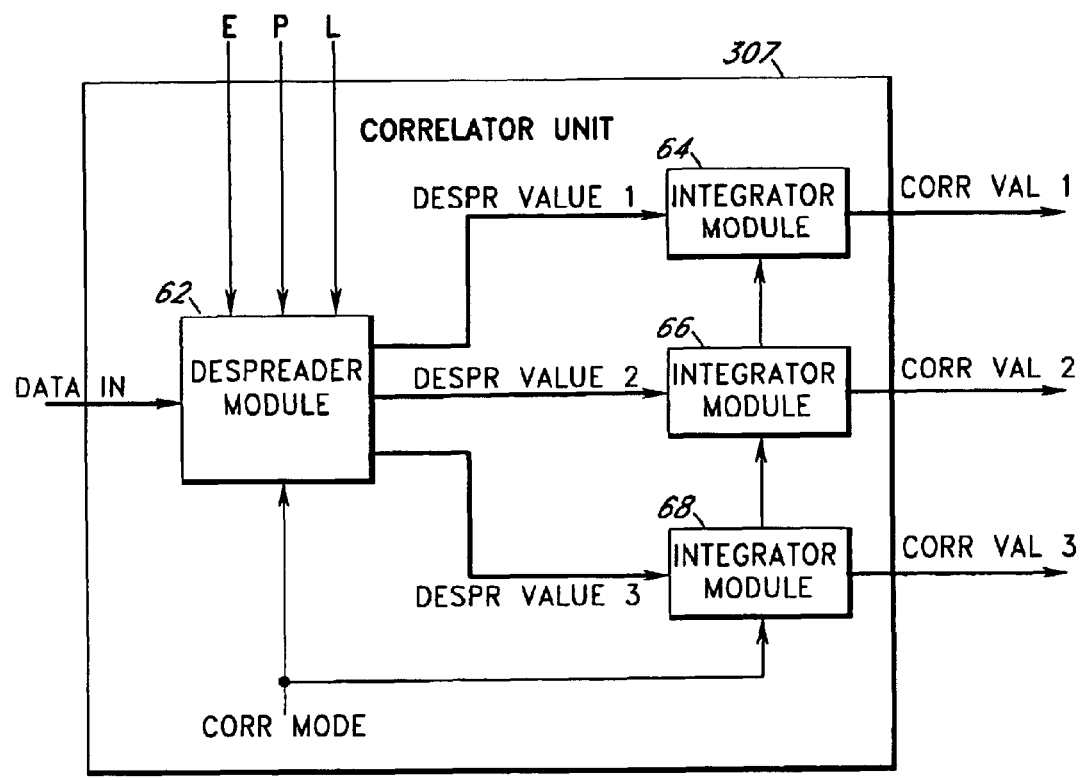
FIG. 10 is a schematic representation of a correlator unit in accordance with an embodiment of the present invention.

A correlator unit block diagram in accordance with an embodiment of the present invention is shown in FIG. 10. A correlator unit such as 307 in accordance with the present invention consists of a complex despreader module 62 and three complex integrator modules 64, 66, 68. The despreader module 62 multiplies the complex image reject mixer output signal (DataIn) with three code sequences. Each integrator module 62, 64, 66 integrates a despread data-sequence over a programmable integration interval equal for all integrators 62, 64, 66 of a correlator unit 307.

The despreader module 62 multiplies the complex baseband signal by three code sequences. Each code sequence is a combination of the three spreading code sequences E, P and L. Valid combinations of the code sequences E, P and L are: (P,E,L), (P,E-L,Off), (P,E-L,E), (P,E-L,L), (P,P,Off) and (B,Off,Off) with Off representing "not used" and B representing "bypassed". The principal usage for the different combinations of code sequences are:

(P,E,L): This combination is used for fast acquisition or for measuring absolute correlation values of a data sequence despread with E, P and L code sequences e.g. for multipath mitigation techniques. Also tracking with separate E and L measurements uses this combination.

(P,E-L,Off): This combination is used in tracking mode and when no information about the absolute E or L correlation values is needed.

(P,E-L,E): This combination is used in tracking mode for multipath identification. An extra E measurement is obtained when three channels are slaved equivalent to FIG. 9(b).

(P,E-L,L): This combination is used in tracking mode for multipath identification. An extra L measurement is obtained when three channels are slaved as shown in FIG. 9(b).

(P,P,Off): This combination only uses the P sequence. This is used in the slave channel configured for hybrid parallel-multiplex attitude determination mode.

(B,Off,Off): This combination is used in calibration mode. The despreader 62 is bypassed and only the first integrator is used.

The output of the despreader module 62 are three complex sequences of despread data DesprValue1–3. The I and Q value of DesprValue is either –3, –1, 0, 1 or 3. The value 0 will only occur in E-L configuration, in which case the correlation values are also divided by two.

Figure 11:
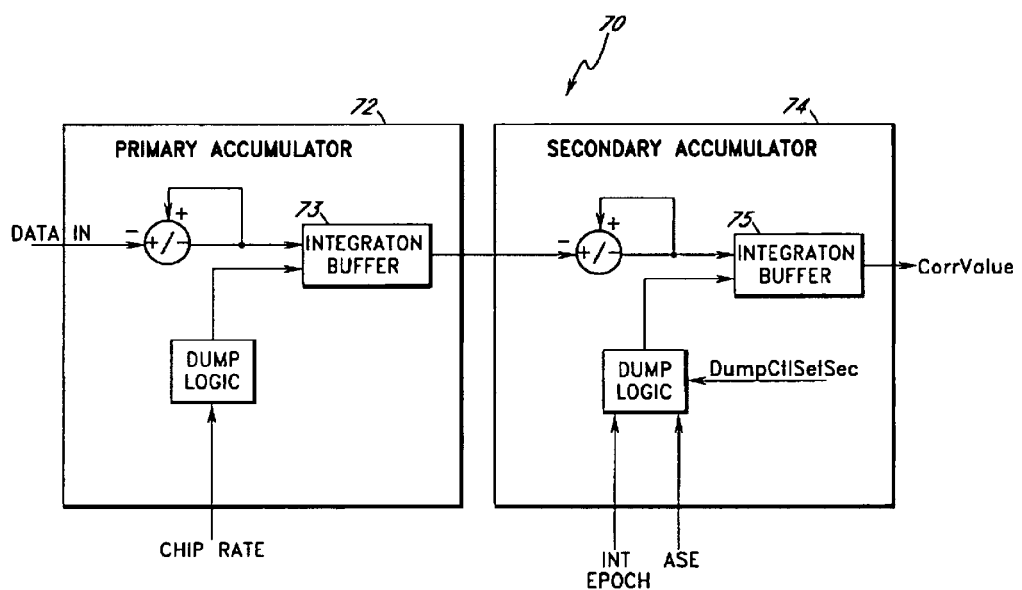
FIG. 11 is a schematic representation of a CA-code integrator module in accordance with an embodiment of the present invention.

An integrator module 64, 66, 68 in accordance with the present invention is a complex integrator. The integrator module 64, 66, 68 of the present invention may find general application in the despreading of spread spectrum signals, e.g. in direct sequence CDMA receivers. The correlator unit of a CA-channel contains CA-code integrators while the correlator unit of a CaP-channel contains CaP-code integrators. A block diagram of the CA-code integrator module 70 in accordance with one embodiment of the present invention is shown in FIG. 11.

A CA-code integrator acts as a 22-bit adder. However, it is preferably realized in accordance with the present invention as a two-stage integrator consisting of a low number of bits accumulator, e.g. a 9-bit two's complement primary accumulator 72 and a full number of bits accumulator, e.g. a 22-bit two's complement secondary accumulator 74. The result of the primary accumulator 72 is dumped at a rate equal to the CA-code chip rate into a first integration buffer 73. The second accumulator 74 integrates the dumped contents of the first accumulator 72 over a longer period, e.g. one IntEpoch period. The result is double buffered in a second integration buffer 75 and kept until the end of the next integration period, when it will be overwritten by the new integrator value. One advantage of this two-stage integration is the fact that the power consumption can be reduced dramatically. Only the small primary accumulator 72 is operating at the high clock rate, while the large secondary accumulator 74 is only running at the chip rate. The use of a two-stage integrator for the CA-code is one of the major advantages of the present invention compared to the known integrators of EP 508 621.

In hybrid parallel-multiplex attitude determination mode, the integration values can also be stored into the secondary accumulator integration buffers 75 on an ASE strobe. Together with the selection of the (P,P,Off) code sequence combination in the despreader module 62, one complex integrator 64, 66, 68 will be programmed to update the secondary accumulator integration buffers 75 on an IntEpoch strobe while the other enabled complex integrator 64, 66, 68 will update the integration buffers on an ASE strobe. The integrators themselves are then reset at both IntEpoch and ASE strobes.

Figure 12:
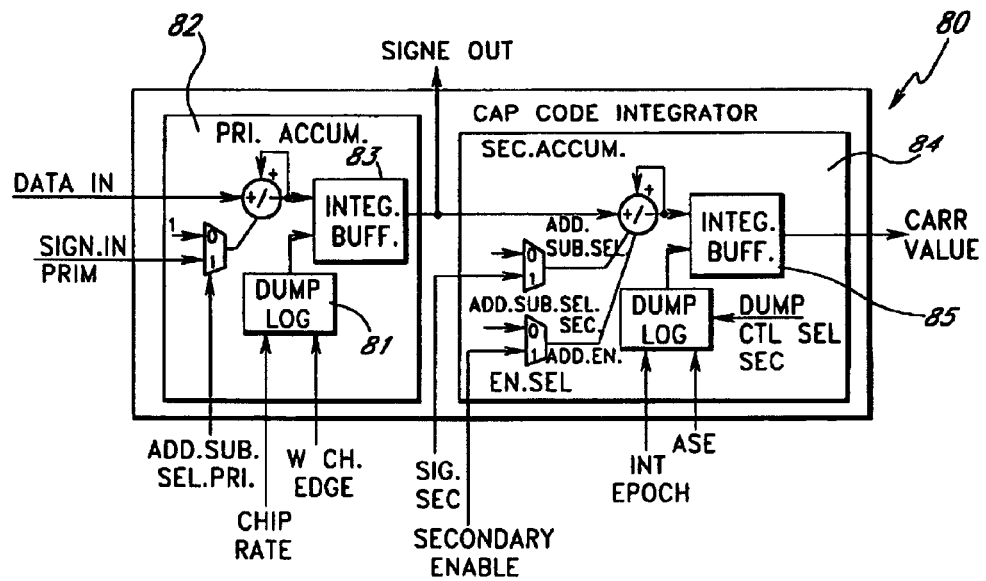
FIG. 12 is a schematic representation of a CaP-code integrator module in accordance with an embodiment of the present invention.

A CaP-code integrator module 80 in accordance with the present invention can be configured to accumulate CA-code modulated signals, P-code modulated signals or encrypted P-code modulated signals, i.e. Y-code modulated signals. A block diagram of the CaP-code integrator module according to this embodiment is shown in FIG. 12. A CaP-code integrator 80 in accordance with one embodiment of the present invention consists of a low number of bits primary accumulator, e.g. a 9-bit two's complement primary accumulator 82 and a full number of bits secondary accumulator, e.g. a 22-bit two's complement secondary accumulator 84. In normal operation both accumulators 82, 84 will never overflow and no data will be lost between the primary and secondary accumulator. The following operational modes can be distinguished:

CA-mode: The CaP-code integrator 80 is configured to track CA-code modulated signals and behaves identically to the CA-code integrator module 70 described above. The primary accumulator 82 results are dumped at a rate equal to the CA-code chiprate into an integration buffer 83. The secondary accumulator 84 is configured to be an adder only and is always enabled.

Attitude determination mode: In attitude determination mode, the CaP-code integrator 80 is reset both on the IntEpoch and ASE strobe. This mode corresponds to the (P,P,off) despreader mode.

P-mode: The CaP-code integrator 80 is configured to track P-code modulated signals. The only difference between the CA-mode and the P-mode is the control of the primary dump logic 81. The SecondaryEnable strobe controls the transfer of the primary accumulator contents to the secondary accumulator 84, while the WChipEdge strobe controls buffering and reset of the primary accumulator 82. The secondary accumulator 84 is configured to be an adder only and is always enabled (EnableSel is 0). The secondary accumulator integration buffers 85 are updated on the command of the IntEpoch strobe.

Figure 13:
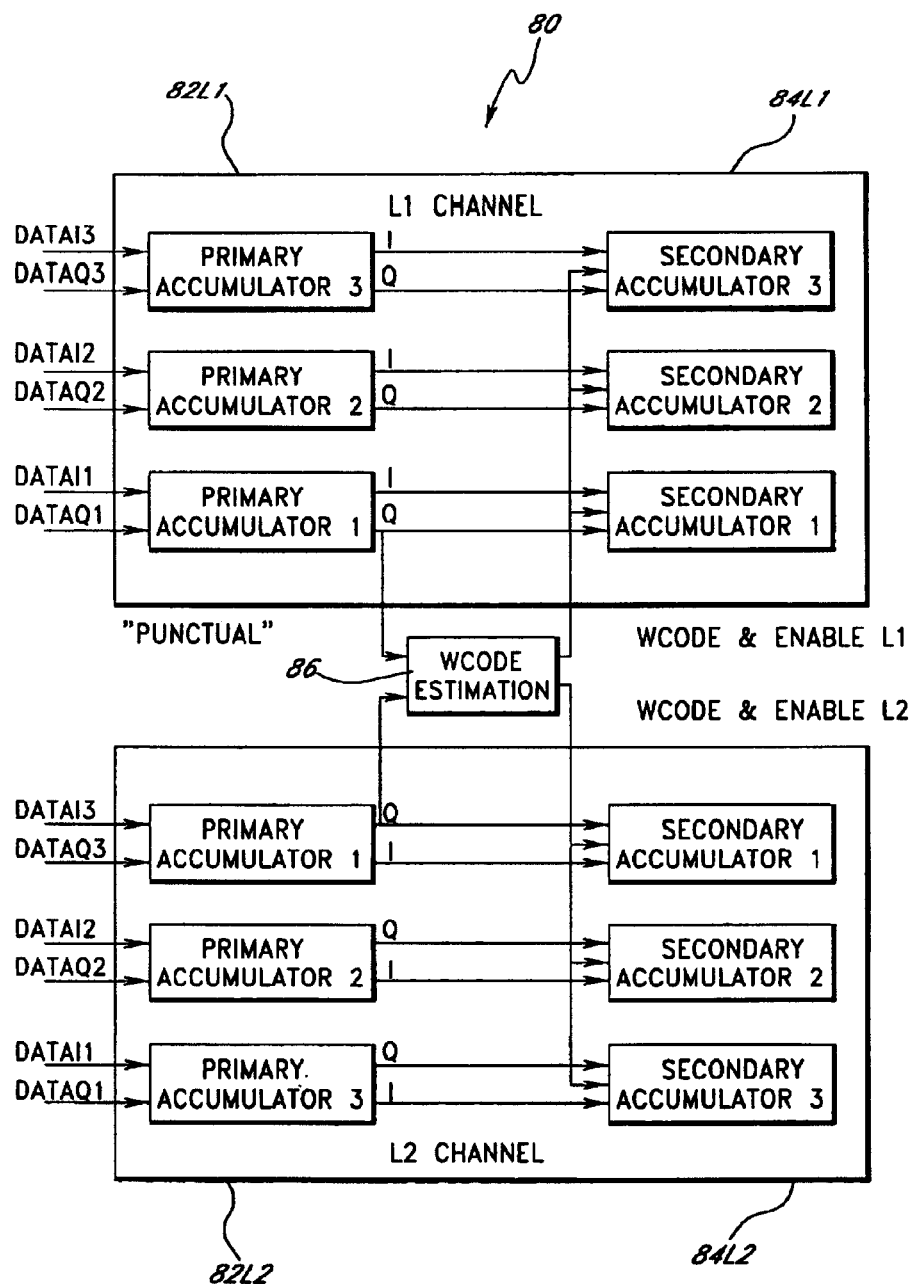
FIG. 13 is a schematic representation of a CaP-code integrator module induding a Y-code estimator in accordance with an embodiment of the present invention.

Y-mode: In the Y-mode, a signal is received which consists of a P-code modulated with an unknown W-code. An exact despreading is not possible, hence it is necessary to estimate the W-code sufficiently to obtain the timing and phase data of the received signals. To decode such a signal, a W-code estimation capability is provided between the primary and secondary accumulator 82, 84 of a dual-frequency channel in accordance with the present invention, as shown schematically in FIG. 13. There are several modes in which the CA-P integrator module 80 can process Wcoded and P-coded signals each of which is an embodiment of the present invention:

Generally, the primary accumulator 82L1, 82L2 of each channel L1 and L2 integrates the incoming data (possibly despread with the known P-code) over one W chip period (generated in the W-rate generator described later). Based on this result, the W-Code Estimation unit 86 estimates the corresponding value of the W-rate.

Codeless Squaring: Functionally the CaP-Code integrator 80 operates as a single adder which adds a sequence of samples over an IntEpoch period. This codeless squaring technique requires a circuit (not shown) that squares the incoming signal before the adding operations. Incoming samples which have not been despread by the locally generated P-code replica sequence are integrated in the primary accumulators 82L1, 82L2 over a time period, e.g. one W-code interval (assumed known) signaled by WchipEdge. The primary and secondary accumulators 82, 84 (82L1, 82L2; 84L1, 84L2) are configured in add mode and are always enabled. The secondary integration buffers 85 are updated on IntEpoch strobes.

Coded Squaring: Functionally the primary accumulator 82 operates as an adder which adds a sequence of despread (with a locally generated replica of the P-code) samples over one W-code interval signaled by WchipEdge. The secondary accumulator 84 operates as an adder which adds the absolute values of the primary accumulator 82. The secondary accumulator 84 is configured to add absolute primary accumulation values by selecting the SignInSec input bit (this is a kind of "squaring"). This bit is preferably the sign bit of the value from the Q-branch of the complex primary accumulator 82 which is processing the "punctual" code replica (P of E,P,L) of the first integrator 82 (this branch normally has the highest strength of the relevant signal but the present invention is not limited thereto). The secondary accumulator integration buffers 85 are updated on IntEpoch strobes.

Coded cross-correlation: Functionally the primary accumulator 82 operates as an adder which adds a sequence of despread (with a locally generated replica of the P-code) samples over one W-code interval signaled by WchipEdge. The secondary accumulator 84 operates as an adder which adds the primary values of an L1 (alternatively L2) channel multiplied by the sign bit of the L2 (alternatively L1) primary accumulator. The secondary accumulator 84 is configured to add absolute primary accumulation values by selecting the SignInSec input bit. For an L1 (L2) channel this bit is the sign bit of the Q-branch of the complex primary accumulator value of the first integrator 82 of the L2 (L1) channel. The secondary accumulator 84 is enabled by the SecondaryEnable strobe generated by the P-code generator unit. The secondary accumulator integration buffers 85 are updated on IntEpoch strobes.

Figure 14:
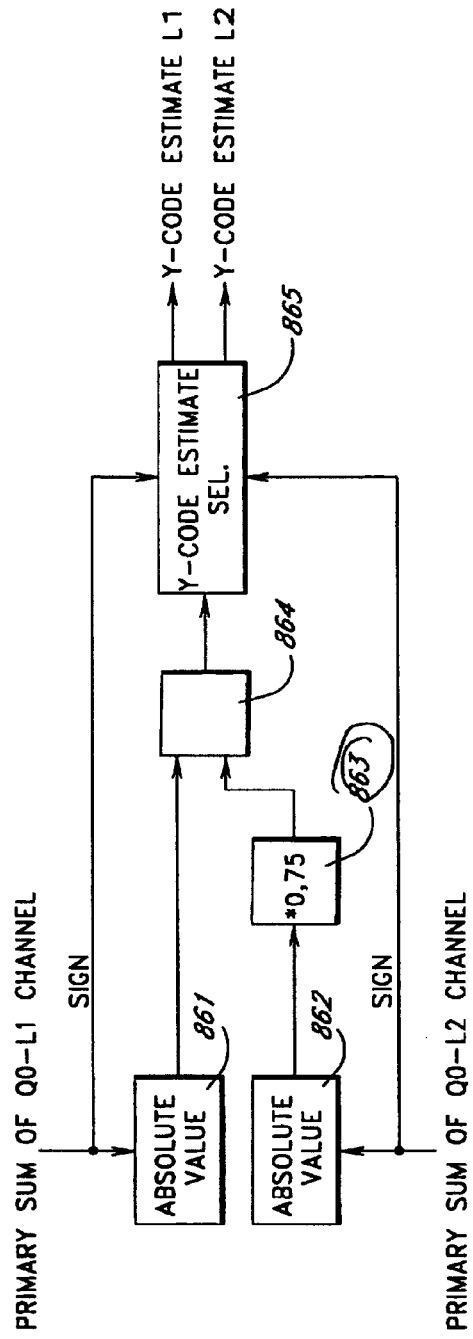
FIG. 14 is a schematic representation of a Y-code estimator in accordance with an embodiment of the present invention.

Combined Y-code estimate: In a further embodiment of the present invention, the primary accumulator 82 operates functionally as an adder which adds a sequence of despread (with a locally generated replica of the P-code) samples over one W-code interval signaled by WchipEdge. The secondary accumulator 84 operates as a combiner which combines the primary values of the primary accumulator 82 and the estimated W-code chip. One method of combining includes summing the values output by the primary accumulator 82 multiplied by the estimated W-code chip value. However, the present invention includes other methods of combining. For instance, the present invention includes combining the outputs of the primary accumulator 82 in dependence upon a confidence level in each output from accumulator 82. The estimated W-code chip is obtained by comparing the absolute values of the primary accumulator of the Q-branch of the complex primary accumulator value of the first integrator 82 of the L1 and L2 channel. The estimated W-code chip value (or Y-code value) is the sign bit of the largest value from this comparison. Because of the lower transmit power, a scaling value may be applied to the L2 signal which is usually more powerful than the L1 signal. A value of 0.75 is suitable. The secondary accumulator integration buffers 85 are updated on IntEpoch strobes. FIG. 14 shows one embodinent of the selection logic required to provide the Y-code estimate indicated above. The outputs of the primary accumulators 82L1 and 82L2 are for the L1 and L2 channels, respectively are applied to absolute value circuits 861, 862, respectively, whereas the sign of each of these primary accumulated outputs is transferred to a Y-code estimate selector (or W-code chip estimate selector) 865. In absolute value circuits 861, 862 the absolute value of the respective primary accumulator value is determined. The absolute value output from circuit 862 may be modified to allow for received power differences between the L1 and L2 signals, e.g. it can be multiplied by a factor such as 0.75 (multiplier 63). The modified absolute values are input to a comparator 864 which compares the two absolute values and outputs a signal to a Y-code estimate selector 865 indicating which of the signals from L1 or L2 has the largest absolute value. The selector 865 selects the sign of the signal with the largest absolute value as the value for the W-code chip or, optionally, an alternative value. The optional alternative value may be zero, e.g. when the confidence in the result is low. The output for the Y-code estimate selector 865 is combined with each of the primary accumulated values of the L1 and L2 accumulators 82L1 and 82L2 for use in the secondary accumulators 84L1 and 84L2 respectively.

A P-code unit such as 42 in accordance with the present invention has two main functions: generating the replicas of the GPS and GLONASS P-code sequences for L1 and L2 and generating the W-code integration control strobe signals (WChipEdge) for L1 and L2. The latter is used for tracking the GPS Y-code signal with the coded squaring, the coded cross-correlation technique and other techniques described above particularly the combined Y-code estimate embodiment of the present invention. One P-code unit 42–45 is provided per dual-frequency channel.

The P-code sequence and the sequence of W-code integration control strobes are the same for L1 and L2 but with a relative delay due to different ionospheric and front-end group delays at the two frequencies L1 and L2. The total group delay difference between L1 and L2 does not exceed 1 microsecond. This delay is the sum of the maximum specified ionospheric group delay of 800 ns between L2 lagging L1 and 200 ns due to front-end group delays. L1 can only lag L2 due to different front-end group delays. Hence the total group delay between L1 and L2 can vary between –200 ns and 1 microsecond. A delay of 1 microsecond is equivalent to 10 GPS P-code chips or 5 GLONASS P-code chips, while 200 ns corresponds to 2 GPS P-code chips or 1 GLONASS P-code chip. These numbers are a factor of 10 lower for CA-code chips.

Figure 15:
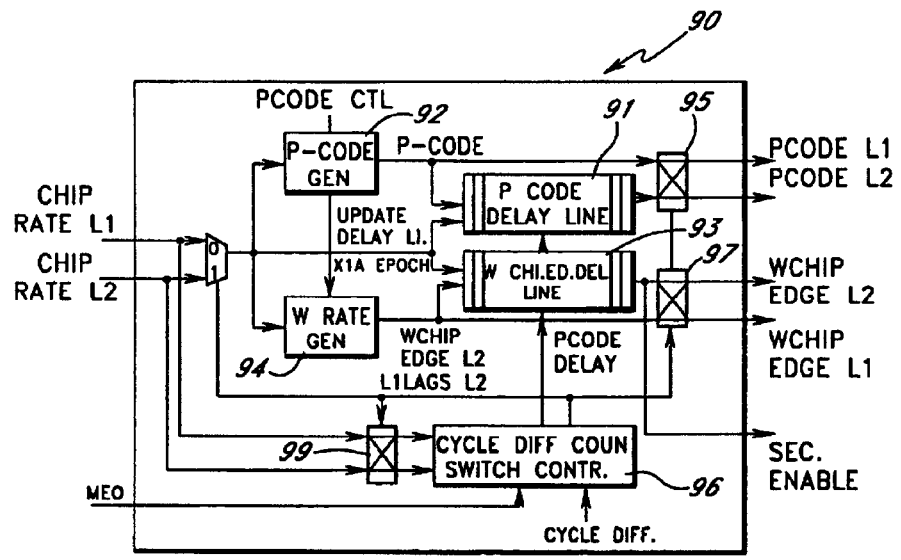
FIG. 15 is a schematic representation of a P-code unit in accordance with an embodiment of the present invention.

A P-code unit block diagram in accordance with an embodiment of the present invention is shown in FIG. 15. Its main modules are the P-code generator 92, the W-rate generator 94, the cycle difference counter and switch controller 96, the P-code and WChipEdge delay-lines 91, 93 and the sequence switches 95, 97, 99. The P-code generator 92 contains functionality for generating replicas of the GPS and GLONASS P-code sequences, P-code observables, and functionality to initialize the P-code and perform P-code handover which controls the enabling of the P-code. Because both code sequences are delayed versions of the same code, a single P-code generator 92 and a single W-Rate generator 94 with additional delay-line 93, and control and switching logic is used to produce both sequences for L1 and L2. The lagging sequence is obtained from a delay-line 91, 93 controlled by the cycle difference counter 96 while the other is taken directly from the generator output which is the replica of the P-code and the W chip edge, respectively. The cycle difference counter 96 records the phase difference between the L1 P-code code sequence and the L2 P-code sequence as an integer number of code chips. This phase difference is the same for the L1, L2 W chip edges. An initial difference is programmed by the microprocessor 101 and represents the relative delay of the L1 and the L2 sequences. It is the accurate determination of this difference which needs to be performed by the acquisition software. The switch control and the switches 95, 97, 99 enable the microprocessor 101 to select which of the two L1 or L2 sequences of P-code and W chip edges is lagging the other.

The GLONASS P-code is a binary sequence with a nominal chip rate of 5.11 Mhz generated by the code NCO and a sequence duration of precisely one second. The P-code is the tenth tap of a 25-tap linear feedback shift register (LFSR) with generating polynomial defined as:

$$G_P = 1 + X^3 + X^{25}$$

The code sequence is short-cycled to a length of 5,110,000 chips, this corresponds to the LFSR state of "0CBE669" hexadecimal. The initial state of the P-code generator is a vector of 25 ones. This state coincides with the one-second mark in the GLONASS navigation message.

The GPS P-code is a binary sequence with a nominal chip rate of 10.23 MHz generated by the code NCO and a sequence duration of precisely one week. The GPS P-code is a modulo-2 addition of two sequences, the X1 sequence and the X2 sequence. The code for SV is obtained by delaying the X2 sequence by chips prior to modulo-2 addition to the X1 sequence, where is a value ranging from 1 to 37. The X1 code is generated by the modulo-2 addition of two short-cycled maximum-length sequences, whose generating polynomials are defined as:

$$X1A = 1 + X^6 + X^8 + X^{11} + X^{12}$$

$$X1B = 1 + X^1 + X^2 + X^5 + X^8 + X^{10} + X^{11} + X^{12}$$

The X1A sequence is short-cycled to a length of 4092, while the X1B sequence is short-cycled to a length of 4093. The X1 sequence has a period of 3750 X1A periods, which is equal to 15,345,000 P-code chips or 1.5 seconds. When the X1B LFSR completes its 3749th period it is halted for the duration of 343 chip periods (until the X1A LFSR completes its 3750th period). On completion of each X1 period both X1 LFSRs are reset to their initial states as defined in table 1. The X1 epoch indicates the end of each X1 period.

Similar to the X1 code, the X2 code is generated by the modulo-2 addition of two short-cycled maximum-length sequences, whose generating polynomials are defined as:

$$X2A = 1X^1 + X^3 + X^4 + X^5 + X^7 + X^8 + X^9 + X^{10} + X^{11}X^{12}$$

$$X2B = 1X^2 + X^3 + X^4 + X^8 + X^9 + X^{12}$$

The X2A sequence is short-cycled to a length of 4092, while the X2B sequence is short-cycled to a length of 4093. Similar to the X1 sequence, the X2 period contains 3750 X2A periods. When the X2B LFSR completes its 3749th period it is initially halted for the duration of 343 P-code chip periods. When the X2A LFSR completes its 3750th period it is also halted. Subsequently, both X2A and X2B LFSRs are halted for a further duration of 37 P-code chip periods, causing the X2 period to be 37 chip periods longer than the X1 period. After this delay, the X2A and X2B LFSRs are reset to the initial states shown in table 2.

TABLE 1

| LFSR | initial state |
| --- | --- |
| X1A | 001001001000 |
| X1B | 010101010100 |
| X2A | 100100100101 |
| X2B | 010101010100 |

The Z counter which is located in the P-code units such as 42, is a 19-bit counter with a valid range of 0 to 403,199 (period of 403,200). This counter counts the number of elapsed X1 epochs since the start of the week, commonly referred to as the Z count. In its final state the Z counter signals End Of Week (EOW). During the last X1A period of a week, and after reaching their final state, the X1B, X2A and X2B generators will be halted until the X1A generator reaches its final state. The final X1A epoch causes all generators to be restarted from their respective initial states and the Z count to be reset to 0.

When the initialization process of the P-code generator 92 is triggered, the X1 generator is initialized to the initial states shown in table 1. To establish the correct relative phase between the X1 and X2 sequences corresponding to the programmed Z count, the X1 generator is automatically clocked for 37 times the Z count. After the X1 generator reaches its correct state the X2 generator is initialized to the initial states shown in table 1. Subsequently, both generators are clocked until the occurrence of an X1 epoch and then halted. This initialization process takes a number of cycles equivalent to exactly a full X1 period of 1.5 s.i.e. 15,345,000 cycles.

After the P-code generator 92 has been initialized the P-code handover starts the generation of a P-code sequence at the correct time instance. This mechanism requires hardware-firmware interaction. After initialization, the P-code generator 92 should not be enabled until the first bit of the preamble of the next subframe has been received. As decoding of the navigation data is a firmware task, this event must be signaled by the firmware. The P-code generator 92 is then enabled on the following active IntEpoch. After hand-over the setting is automatically reset.

The P-code observable is used to find a high-precision pseudorange. It is obtained from a 24-bit counter, which counts the number of P-code chips. It is reset after reaching a count equal to the nominal number of P-code chips per second for GLONASS and per 1.5 seconds for GPS. This number is equal to 5,110,000 GLONASS P-code chips or 15,345,000 GPS P-code chips. At the end of each measurement epoch the P-code chip count is stored in an observable register. The P-code chip counter is reset at P-code hand-over.

The W-rate generator 94 generates the control strobes for dumping the primary accumulator stages of the CaP-integrator modules 80. It is a programmable 5-bit decrementer which counts P-code chips. Each time the decrementer reaches 0, a WChipEdge strobe is generated and the decrementer is reloaded. M strobes are generated with a period of A P-code chips followed by N strobes at a rate of B P-code chips. The sequence is repeated until an X1A-epoch, generated by the P-code generator. The start of a new sequence can be delayed by S P-code chips.

The cycle difference counter 96 is a 5-bit counter that keeps track of the delay between the L1 and L2 P-codes, expressed in P-code chips. In conjunction with the variable delay-line 91, 93, it derives a delayed version of a P-code sequence. Similar to the P-code, L1 and L2 W-code chip edges are generated from a single W rate generator 94. The switch controller 96 keeps track of which sequence L1 or L2 is lagging the other. The change in phase difference is further controlled indirectly by programming the frequency and phase of the code NCO's driving the P-code generator 92, which are the clock signals triggering the cycle difference counter and the switch controller 96. When the L1 code NCO (not shown, located in the CA-Code generators) produces a clock pulse a programmable counter is incremented and when the L2 code NCO produces a clock pulse it is decremented. When both NCOs generate a clock pulse the counter is inhibited. To prevent incorrect control of the delay-line 91, 93 the cycle difference counter is inhibited when it reaches its maximum delay of 10.

Due to front-end group delay differences between the L1 and L2 RF sections, the L2 P-code may lead the L1 P-code. Therefore, it is possible to delay the L1 P-code relative to the L2 P-code by interchanging the L1 and L2 inputs and associated outputs whenever the L1-L2 delay crosses zero. This functionality is controlled by the switch controller 96 and the associated switches 95, 97. The use of delay line 91 with only delayed timings and the switch 95 to switch between the L1 and L2 signals reduces the size of delay line 91 compared to conventional designs which is a significant advantage compared with the correlator known from EP 508 621.

The cycle difference counter 96 is programmed on an IntEpoch strobe. The value of the cyde difference counter 96 is an observable which is stored at the end of each measurement interval, i.e. at the same time as the other code and carrier phase observable registers. The L1-L2 delay observable is obtained by summing the contents of this observable and the difference of the L1 and L2 code NCO phase registers.

In each P-code unit 90 there is one P-code delay line 91 and one W-rate delay line 93 of length 10. Both delay lines 91, 93 are clocked by the chip rate of the leading sequence shifting the bits in the delay-line 91, 93 similar to a first-in-first-out buffer. Its input is a P-code chip for the P-code delay line 91 and a W-edge for the W-rate delay line 93. The output is a tap of 1 to 10 controlled by the cycle difference counter 96. A cycle difference counter value of zero selects the input of the delay line 91, 93.

Although the specific embodiments have been described with respect to particular applications and architectures, modifications and changes of the illustrated embodiments lie within the scope of the invention as defined in the attached claims.

What we claim is:

1. An apparatus for processing L1 and L2 spread spectrum signals received from at least one satellite of a global positioning system, wherein each of the spread spectrum signals includes a unique frequency carrier with a known pseudo-random known code modulated thereon, each L1 and L2 signal being converted into a plurality of digital signals, the apparatus comprising:

a generator for generating a single replica of the known code;

a delay line connected to the generator, the delay line having a plurality of taps wherefrom the known code replica is available at different relative phases thereof;

a first demodulator connected to the generator for demodulating the converted L1 and L2 signals with the single replica of the known code without any substantial delay, the first demodulator output being associated with the L1 signal;

a second demodulator selectably connectable to any one of the taps of the delay line for demodulating the converted L1 and L2 signals with a delayed replica of the known code, the second demodulator output being associated with the L2 signal; and switches for selectably switching the converted L1 and L2 signals for demodulation by the second demodulator, and selectably switching the converted L1 and L2 signals for demodulation by the first demodulator.

2. A method of processing L1 and L2 spread spectrum signals received from at least one satellite of a global positioning system, wherein each of the signals includes a unique frequency carrier with a known pseudo-random code modulated thereon, each L1 and L2 signal being converted into a plurality of digital signals, the method comprising:

locally generating a single replica of the known code;

applying the single replica of the known code to a delay line having a plurality of taps wherefrom the code replica is available at different relative phases thereof;

first demodulating the converted L1 and L2 signals with the single replica of the known code without any substantial delay, the first demodulated signal being associated with the L1 signal;

second demodulating the converted L1 and L2 signals with the generated replica of the known code from one of the taps of the delay line, the second demodulated signal being associated with the L2 signal; and selectably switching the converted L1 and L2 signals for the first demodulation and selectably switching the converted L1 and L2 signals for the second demodulation.

* * * * *

UNITED STATES PATENT AND TRADEMARK OFFICE
CERTIFICATE OF CORRECTION

PATENT NO. : 6,967,992 B1
APPLICATION NO. : 09/196658
DATED : November 22, 2005
INVENTOR(S) : Rabaeijs et al.

It is certified that error appears in the above-identified patent and that said Letters Patent is hereby corrected as shown below:

Col. 1, line 3, after "Litton et al." insert --342/357--

Col. 1, line 4, after "Turney" insert --375/208--

Sheet 11 of 13, Fig. 12, delete "SIGNE" and insert --SIGN--

Sheet 11 of 13, Fig. 12, delete "CARR" and insert --CORR--

Col. 5, line 20, delete "code," and insert --code;--

Col. 6, line 51, delete "induding" and insert --including--

Col. 8, line 42, delete "and1or" and insert --and/or--

Col. 8, line 60, delete "corrdator" and insert --correlator--

Col. 8, line 67, delete "frontend" and insert --front-end--

Col. 10, line 66, delete "unidirectional" and insert --uni-directional--

Col. 12, line 19, delete "sampled" and insert --sampled--

Col. 13, line 53, after "P-code" delete "code"

Col. 16, line 33, delete "Mhz" and insert --MHz--

Col. 16, line 33, before "the" insert ","

Col. 18, line 45, delete "Wcoded" and insert --W-coded--

Col. 19, line 57, delete "embodiment" and insert --embodiment--

Col. 20, line 3, delete "63)." and insert --863).--

Col. 21, line 4, delete "Mhz" and insert --MHz--

Col. 22, line 20, delete "s.i.e" and insert --s. i.e.--

UNITED STATES PATENT AND TRADEMARK OFFICE
CERTIFICATE OF CORRECTION

| | |
|---|---|
| PATENT NO. | : 6,967,992 B1 |
| APPLICATION NO. | : 09/196658 |
| DATED | : November 22, 2005 |
| INVENTOR(S) | : Rabaeijs et al. |

It is certified that error appears in the above-identified patent and that said Letters Patent is hereby corrected as shown below:

Col. 23, line 17, delete "cyde" and insert --cycle--

Signed and Sealed this

Eighteenth Day of July, 2006

JON W. DUDAS
*Director of the United States Patent and Trademark Office*